US008758137B2

(12) United States Patent
Walker et al.

(10) Patent No.: US 8,758,137 B2
(45) Date of Patent: Jun. 24, 2014

(54) SYSTEMS AND METHODS FOR CONDUCTING LOTTERY GAMES

(75) Inventors: Jay S. Walker, Ridgefield, CT (US); Stephen C. Tulley, Monroe, CT (US); Jeffrey Y. Hayashida, San Francisco, CA (US); Russell P. Sammon, San Francisco, CA (US); Gregory J. Scribner, Southbury, CT (US); Zachary T. Smith, Norwalk, CT (US); Renny S. Talianchich, London (GB)

(73) Assignee: Inventor Holdings, LLC, Stamford, CT (US)

( * ) Notice: Subject to any disclaimer, the term of this patent is extended or adjusted under 35 U.S.C. 154(b) by 1347 days.

(21) Appl. No.: 12/234,144

(22) Filed: Sep. 19, 2008

(65) Prior Publication Data

US 2009/0082081 A1 Mar. 26, 2009

Related U.S. Application Data

(60) Provisional application No. 60/973,975, filed on Sep. 20, 2007, provisional application No. 60/984,941, filed on Nov. 2, 2007, provisional application No. 61/024,088, filed on Jan. 28, 2008, provisional application No. 61/043,234, filed on Apr. 8, 2008.

(51) Int. Cl.

| | |
|---|---|
| ***A63F 9/00*** | (2006.01) |
| ***A63F 13/00*** | (2014.01) |
| ***G06F 17/00*** | (2006.01) |
| ***G06F 19/00*** | (2011.01) |

(52) U.S. Cl.
USPC ........................................................ 463/41

(58) Field of Classification Search
USPC ........................................................ 463/41
See application file for complete search history.

(56) References Cited

U.S. PATENT DOCUMENTS

| | | | | |
|---|---|---|---|---|
| 5,083,272 | A | 1/1992 | Walker | |
| 5,987,101 | A | 11/1999 | Rathore et al. | |
| 6,011,835 | A | 1/2000 | Rathore et al. | |
| 6,273,816 | B1 | 8/2001 | Bansal | |
| 7,187,761 | B2 | 3/2007 | Bookstaff | |
| 7,889,853 | B2 | 2/2011 | Sutcliffe | |
| 2004/0225565 | A1 | 11/2004 | Selman | |
| 2005/0107152 | A1 | 5/2005 | McGee et al. | |
| 2005/0192078 | A1 * | 9/2005 | Jawaharlal | 463/17 |
| 2005/0215306 | A1 * | 9/2005 | O'Donnell et al. | 463/17 |
| 2006/0009275 | A1 * | 1/2006 | Packes et al. | 463/17 |

(Continued)

OTHER PUBLICATIONS

Maine State Lottery, "How to Claim Prizes," http://web.archive.org/web/20060204192050/http://www.mainelottery.com/players_info/prizes.html Created Feb. 4, 2006, Accessed May 9, 2012.*

Vapor Mobile Inc. Sweepstakes—TGI Friday's Sweepstakes, How to Play, copyright 2007, 2 pp.

(Continued)

*Primary Examiner* — Omkar Deodhar
*Assistant Examiner* — Reginald Renwick
(74) *Attorney, Agent, or Firm* — Michael D. Downs; Fincham Downs, LLC

(57) ABSTRACT

Described are methods, systems and apparatus for enabling a lottery player to receive information corresponding to a lottery outcome in association with receipt of an incoming communication. In an implementation, the method includes receiving an indication of an incoming communication, determining a lottery entry outcome, and determining an audible output based on the lottery entry outcome and on the indication of the incoming communication. The method also includes outputting the audible output via a player device to indicate both the incoming communication and the lottery entry outcome.

68 Claims, 7 Drawing Sheets

(56) References Cited

U.S. PATENT DOCUMENTS

| | | | | |
|---|---|---|---|---|
| 2006/0020484 | A1* | 1/2006 | Hugo | 705/1 |
| 2006/0035697 | A1* | 2/2006 | Packes et al. | 463/17 |
| 2008/0146337 | A1* | 6/2008 | Halonen et al. | 463/42 |
| 2008/0167060 | A1* | 7/2008 | Moshir et al. | 455/466 |
| 2008/0280669 | A1* | 11/2008 | Kane et al. | 463/20 |

OTHER PUBLICATIONS

Vapor Mobile Inc. Sweepstakes—Frequently Asked Questions, copyright 2007, 2 pp.

Vapor Mobile Inc. Sweepstakes—How to Play, copyright 2007, 3 pp.

Justdial Sweepstakes, Long Distance US Calling Cards, Official Sweepstakes Rules, Revised Sep. 1, 2005, 2 pp.

* cited by examiner

SYSTEMS AND METHODS FOR CONDUCTING LOTTERY GAMES

The present application claims the benefit of U.S. Provisional Application No. 60/973,975, filed Sep. 20, 2007, and entitled SYSTEMS AND METHODS FOR CONDUCTING LOTTERY GAMES. The entirety of the above-identified application is incorporated by reference herein for all purposes.

The present application claims the benefit of U.S. Provisional Application No. 60/984,941, filed Nov. 2, 2007, and entitled SYSTEMS AND METHODS FOR CONDUCTING LOTTERY GAMES. The entirety of the above-identified application is incorporated by reference herein for all purposes.

The present application claims the benefit of U.S. Provisional Application No. 61/024,088 filed Jan. 28, 2008, and entitled SYSTEMS AND METHODS FOR CONDUCTING LOTTERY GAMES. The entirety of the above-identified application is incorporated by reference herein for all purposes.

The present application claims the benefit of U.S. Provisional Application No. 61/043,234, filed Apr. 8, 2008, and entitled SYSTEMS AND METHODS FOR CONDUCTING LOTTERY GAMES. The entirety of the above-identified application is incorporated by reference herein for all purposes.

FIELD OF THE INVENTION

The present invention generally relates to methods, systems and apparatus that enable a player to receive information corresponding to a lottery game outcome in association with receipt of an incoming communication. More specifically, described are methods, systems and apparatus for providing a predetermined audible output, such as a modified or altered ringtone, that indicates an incoming call to a call recipient (or player), wherein the type, tone and/or frequency of the ringtone also indicates a particular lottery entry outcome.

Advantages and features of the invention will become apparent upon reading the contents of this document, and the nature of the invention may be more clearly understood by reference to the following detailed description of the invention, the appended claims and to the drawings attached hereto.

DETAILED DESCRIPTION OF THE INVENTION

Figure 1A:
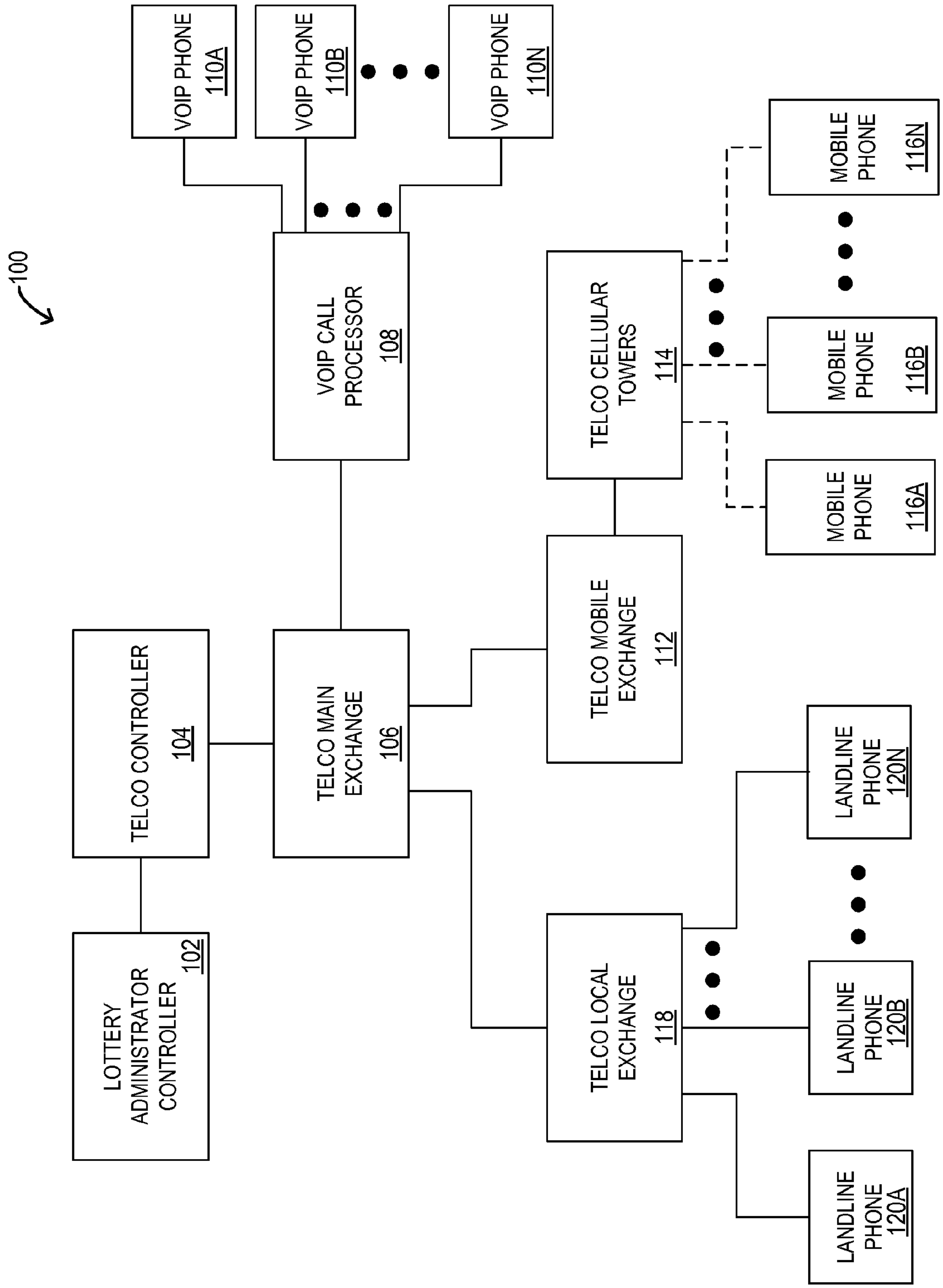
FIG. 1A is a simplified block diagram illustrating an example system that may be useful for implementing one or more of the various features according to an embodiment of the invention.

Presented are methods, systems and apparatus for a telephone user (e.g. a recipient of a cell phone call) to receive information corresponding to a lottery outcome in conjunction with the receipt of an incoming telephone call and/or other communication (e.g. text message, page, e-mail, etc.), where at least a portion of the information corresponding to the provision of the lottery outcome is provided to the call recipient as one or more audible output(s) (for example, telephone ringtone(s)). Thus, the telephone user can receive both an incoming communication that has nothing to do with a lottery game, and information concerning a lottery entry.

In some embodiments, an audible output (such as a ringtone) may be determined at least in part based on information associated with the lottery outcome. For example, a first audible ringtone may be determined and output to a call recipient (e.g. at the time of receiving a telephone call) if the lottery outcome is determined to be a winning result, and a second, different audible ringtone may be determined and output if/when the lottery outcome is determined to be a losing game result.

In some embodiments, a first audible ringtone may be output if a winning lottery outcome is associated with a first payout value (e.g. a $5 win may correspond to the output of "Ringtone A") and a second audible ringtone may be output if/when a winning lottery outcome is associated with a second payout value that is different than the first payout value (e.g. a $30 win may correspond to the output of "Ringtone B", and a $100 payout may correspond to the output of "Ringtone C").

According to some embodiments, information associated with one or more winning lottery outcomes may be transmitted to, received by and stored at/on a call recipient's telephone (e.g. cell phone, smart phone) or other device associated with the recipient (for example, a personal digital assistant (PDA) device, a "Blackberry™" device, and/or a SONY PSP™ device). The information may then be used by the recipient to redeem (or otherwise claim) any payout associated with such lottery outcome(s).

In addition to the above aspects, methods for the provision, acquisition and administration of lottery outcome information are disclosed herein. For example, according to some embodiments, lottery outcome information may be acquired and/or accessed by a player and/or a call recipient by direct purchase via the player's and/or recipient's telephone (e.g. via an application on the player's cell phone); or via one or more physical retail establishment(s) (e.g. via a ticket (or other medium) bearing a code, which may be issued via a lottery terminal associated with a physical store or lottery agent), and/or via one or more other player device(s) (e.g. via a personal computer having access to a lottery authority web site). Numerous other aspects and embodiments are described herein.

A. Definitions

The following definitions are provided to aid the reader in understanding the present methods, systems and apparatus.

A "Transmission Request" is an indication of an incoming communication. In some embodiments, an incoming communication may include a phone call (mobile, voice-over-IP, or land line), SMS message (Short Message Service), EMS message (Enhanced Message Service), MMS message (Multimedia Message Service), voicemail, e-mail, and the like.

A "Transmitting Party" is a party that initiates a transmission request to a receiving party. A transmitting party may commonly be referred to as a "caller," though the transmission request from a caller may not be limited to a phone call (see above definition). The transmitting party or caller may be an actual person, Interactive Voice Response (IVR) system, or automated (e.g. outbound) messaging service.

A "Receiving Party" is a party that receives a transmission request from a transmitting party. The receiving party may be referred to in some embodiments as a "call recipient." Of course, as discussed above, a transmission request need not be limited to a phone call.

A "Player" is a participant in a game of chance such as a lottery. In some embodiments, the receiving party or call recipient is considered to be a player since she or he may be associated with one or more lottery entries or outcomes and/or may receive information associated with one or more lottery entries or outcomes.

A "Telephone" may comprise any of the following devices:

- A pre or post-paid cellular telephone (aka "cell phone"). Examples of cell phone manufacturers include, but are not limited to, Motorola, Nokia, Samsung, LG, and Sanyo.
- A PDA, smart phone, or tablet computer with network capabilities (e.g., Apple iPhone™, Nintendo DS™).
- A traditional telephone (e.g., a "land line", meaning a telephonic device that is connected by one or more wires to a telephone network).
- A satellite telephone.
- An alphanumeric pager.
- A VoIP phone, wherein "VoIP" corresponds to "Voice Over Internet Protocol". Examples of companies that provide VoIP phone services include, but are not limited to, Skype and Vonage. In addition, a personal computer with speakers and a microphone may be able to function as a VoIP phone. One example of a VoIP handset is the Linksys CIT200™.

It should also be understood that a Telephone may include hardware components and have an operating system that enables it to run applications (such as a lottery ringtone application (LRA), which is described below). Examples of operating systems that may operate on cell phones include, but are not limited to, Symbian™, Windows™ Mobile, Windows™ Pocket PC, PalmOS™, and Linux™.

A "Ringtone" is an audible output that indicates an incoming communication. Ringtones may be pre-installed on a telephone, and may also be downloaded and installed on mobile phones by mobile phone or smart phone users. In some embodiments, a ringtone may be transmitted (e.g. "pushed") to the phone by a telephone company ("telco") or lottery administrator in conjunction with the determination of an incoming communication.

The term "Ringback" means an audible indication that may be heard by a transmitting party or caller, after dialing, but prior to a call being answered by a call recipient. A ringback commonly in use in North America is generated by summing a 440 Hz tone and 480 Hz tone to create a 40 Hz tone. The resulting tone is played in a 2 second on, 4 second off interval.

A "Lottery Outcome" is information associated with one or more instance(s) of a game of chance and provided in exchange for consideration (e.g. monetary consideration). According to some embodiments, a lottery outcome may comprise or include information such as (i) whether or not one or more lottery outcome(s) is/are "winning outcomes" (e.g. correspond to a payout or prize) and/or (ii) any particular payout or prize associated with the outcome if the outcome is indeed a winning outcome. According to some embodiments, a lottery outcome may include an indication for display in a display area of a call recipients cell phone, such as "You Win", "You win $5", "Sorry—Not a winner", "Win $0", and the like.

In accordance with the embodiments disclosed herein, whether or not a particular lottery outcome is a winning outcome may or may not be predetermined (e.g. by a lottery authority). For example, a first lottery outcome may be predetermined by (or on behalf of) a lottery authority and thereafter provided and/or indicated to a player and/or recipient, whereas a second lottery outcome may be determined to be a winning outcome contingent upon an event (e.g. a lottery drawing), which event may occur subsequent to the entitlement or provision (and/or indication) of certain information (e.g., information about an entry in the lottery drawing) to the player/call recipient. For example, according to an embodiment, a previously determined lottery outcome may be provided (or become entitled) to a call recipient and/or player in conjunction with the determination that the call recipient and/or player is receiving an incoming communication (e.g. a telephone call, text message, etc.). According to some embodiments, a call recipient and/or player may receive an entry into a subsequent lottery drawing (first information) in conjunction with the determination that the call recipient and/or player is receiving an incoming communication. In accordance with such embodiments, the determination as to whether the received entry is a winning entry may be contingent upon one or more result(s) (second information) which may be determined subsequent to the provision of the entry information to the call recipient and/or player. More specifically, after a lottery drawing is held, an outcome (e.g. a result and/or payout information associated with the lottery entry) may be determined based on a comparison of the lottery result(s) information to the previously-provided lottery entry information.

A "Lottery Authority" is an entity primarily responsible for the operation and oversight of various lottery hardware, software, data and/or systems. For example, a lottery authority may be contracted by a governmental agency, such as a state lottery authority, to conduct and/or administer various functions associated with lottery games.

A "Lottery Retailer" is a location or service provider via which any one or more of the following may take place:

- A player may register for a lottery outcome;
- A player may obtain the right to receive information associated with one or more lottery outcome(s), in accordance with the methods described herein;
- An additional or new lottery ticket/lottery entry may be purchased;
- A winning lottery outcome may be presented, verified and/or redeemed; and/or A player/call recipient may receive a payout and/or a prize associated with obtaining or receiving a winning lottery outcome.

Convenience stores, gas stations, supermarkets and the like are various examples of traditional lottery retailers.

A "Lottery Ringtone Application" (LRA) is an application that may reside on a player's mobile phone, smart phone or other device associated with a player/call recipient. An LRA may assist in performing various functions described herein, such as player registration, determining player eligibility, receiving and/or processing one or more lottery outcome(s), storing player information, and/or displaying historical lottery outcomes (e.g. results, summaries) to the player. The LRA may be preloaded on the device associated with a player/call recipient and/or may be downloaded from one or more of: a mobile phone provider; a manufacturer; a lottery retailer or operator; and/or a third party vendor.

"Lottery Information" is information associated a lottery outcome. Examples of lottery information may include, but are not limited to whether a lottery entry of the player won or lost (E.g., ringtone #1 for a win, ringtone #4 for a loss); an amount of a lottery win (E.g., ringtone #1 corresponds to a win of less than $10, ringtone #2 corresponds to a win of $10 to $50, and ringtone #3 corresponds to a win of more than $50, or a caller id window shows amount of win "Lotto Win! $15 credited to your account"); whether the player has been entered into a lottery game (E.g., if player is only entered into lottery under certain circumstances (see player preferences described below), or for example, ringtone #1 for a "lottery entry", and ringtone #2 for "no lottery entry this time"); if the player was entered, then which lottery game a player has been entered into (E.g., name of the lottery game may be displayed in a caller id window on a player's cell phone "You have been entered in the Texas Tea Lotto"); a remaining balance of a player account (E.g., if a player has a monetary account that is used to fund lottery entries; or a ringtone #1 if account balance is over or under a predefined amount, or an amount credited to player account ("You have now accumulated $100 of winnings, which will automatically be transferred to your bank account"), or a remaining number of entries in a set of entries (E.g., "outcome #22 has been determined out of your 100 pre-purchased outcomes"); a cost of a lottery entry (E.g., ringtone #1 for $0.10 lottery entry, ringtone #2 for $0.50 lottery entry); lottery game play information (E.g., a video of a lottery scratch card being scratched so that an outcome is revealed); what type of prize a player has won in a lottery win (E.g., if a player is eligible to win non-monetary prizes (e.g., cell phone minutes, free text messages, Internet bandwidth, this next phone call is free)); accumulated and/or aggregated information pertaining to a plurality of lottery outcomes (for example, a total amount of money won so far (e.g., "Total won this month=$23"), or a total number of wins (e.g., "Phone call #54/100—your $6^{th}$ win in this set")).

A "Controller" is one or more computing device(s) (e.g., a central controller, a server) operatively configured to receive, transmit, store, output and/or manage data relating to various aspects of the embodiments described herein, including data associated with one or more of: lottery outcomes; sales agents; sales (e.g. statistics); the provision of one or more outcome(s); payout instances; redemption amounts; redemption instances; accounting functions; player information; player device information and/or other aspects described herein. Some or all of the operations of a controller may be overseen by, or may be performed on behalf of, a lottery authority, as described above.

A "Retailer Terminal" is one or more computing device(s) (e.g., a point of sale terminal (POS), a digital cash register, etc.) operatively configured to receive and transmit data to/from a controller and/or player device on behalf of a retailer/agent and/or output information/data for use by a player and/or retailer. Such data may include, for example: identifying data associated with one or more outcome(s); data associated with one or more lottery entries; game(s); player(s) and/or player device(s) (e.g. a telephone number, player ID, ticket identifier, etc.); identifying data associated with one or more redemption request(s); and/or payout data. For example, the ALTURA® lottery terminal manufactured by GTECH Corp. of Providence, R.I. may be one example of a suitable device that may be adapted to perform various functions of a retailer terminal as described herein.

A "Player Database" is a database that may store information relating to a player such as: payment information, player preferences, player registration, lottery outcomes associated with a player and/or other information. In some embodiments, such information may be used to create a lottery account by or on behalf of a receiving party.

A "Telco" is a Telecommunications company, which may include mobile telephone service providers such as: AT&T, Verizon, Sprint, T-Mobile; or regional providers such as: AT&T, MCI, and Qwest Communications.

B. Example Embodiments

FIG. 1A illustrates is an example system 100 according to an embodiment that may be useful for implementing one or more of the various features described herein. The example system 100 includes various types of controllers, such as a lottery administrator controller 102, and a telco controller 104, which are connected to a telephone company main exchange 106 (telco main exchange). The telco main exchange 106 is also shown connected to a plurality of voice over internet protocol (VOIP) telephones 110A, 110B to 110N through a VOIP call processor 108. Also shown connected to the telco main exchange 106 are a telco mobile exchange 112, which is operatively connected to a plurality of mobile phones 116A, 116B to 116N (for example, cell phones and/or smart phones) through at least one telco cellular tower 114. Lastly, shown connected to the telco main exchange is a telco local exchange 118 and a plurality of landline telephones 120A, 120B to 120N. Thus, the telco main exchange 106 may be connected in or to a variety of networks, exchanges, processors, apparatus, and user devices, which apparatus may be used in one or more of the described embodiments.

In some embodiments, the telco controller 104 receives a transmission request from a transmitting party. The telco controller may be located at a telco main exchange capable of receiving transmission requests from one or more local exchanges and/or mobile exchanges. The transmission request may be in the form of a telephone call originating from a mobile phone, or a voice-over-IP phone, or a landline phone, an SMS, EMS, or MMS message, or could be an incoming email, or a voicemail notification. The transmission request may include information relating to the transmitting party such as the transmitting party's telephone number or network address, the time which the transmitting party sent the request, and/or a message originating from the transmitting party (which could include information relating to the call recipient such as the call recipient's telephone number, and/or the call recipient's name). The telco controller may determine if the call recipient is associated with a record in a player database and/or has an associated lottery account. In some embodiments, the telco controller 104 looks up the call recipient's phone number in a player database and checks to see if that phone number is associated with a lottery account.

The telco controller 104 may determine if the call recipient should go through further eligibility screening, or if the call recipient may be eligible to receive a lottery entry outcome. In one embodiment, the telco controller 104 determines that the call recipient has an associated lottery account and contacts a lottery administrator's controller 102 for further eligibility screening of the call recipient. In another embodiment, the telco controller determines that the call recipient has an associated lottery account and processes additional eligibility screening of the call recipient. In yet another embodiment, the telco controller determines that the call recipient is eligible for a lottery outcome and sends a request for a lottery outcome to a lottery administrator's controller 102.

In an example, a user of a mobile phone 116A transmits a request to receive a lottery outcome each time he receives a call on his mobile phone (e.g. smart phone). In order to do this, the user accesses and indicates this desire on his telco's website. The user also chooses an option that adds payment for any received lottery outcomes to his mobile phone bill. An indication of the user's selected options are then stored in a database that can be accessed by the telco's controller and/or other device.

Referring again to FIG. 1A, upon receiving a request for transmission of a communication to the user, the telco's controller 104 determines that the user has opted to receive a lottery outcome with each incoming call (i.e., by looking up the call recipient's preferences in the database). The telco controller 104 then requests an indication of a lottery outcome from the lottery administrator controller 102. When a winning lottery outcome is determined (by the lottery administrator controller), the telco controller 104, through the telco main exchange 106 and telco mobile exchange 112, causes the call recipient's mobile phone 116A to ring with a winning lottery ringtone. For example, the winning lottery ringtone may include a recorded message that repeats the phrase, "You're a winner! You're a winner!" The telco controller may also record an indication of the winning outcome in the database.

In some embodiments, a lottery authority or other party may develop and/or deploy a lottery ringtone application (LRA) for use by a user/player, player device, and the like. The LRA may function to establish at least two ringtones, at least one of which may be audibly communicated to the player and/or user upon receipt of an incoming communication. More specifically, the application may establish a first ringtone for use when an incoming communication is received from a first source (e.g. a first telephone number or first calling party identified in an address book of the user's player device) and a second, different ringtone for use when an incoming communication is received from at least a second source (e.g. a second telephone number, any telephone number other than the first telephone number, any telephone number other than the first telephone number and for which no specific ringtone has previously been assigned by the user). For example, the application may function to create and or install an entry in an "address book" or "contact list" of a cellular phone of a user, and to associate the created entry with a specific (e.g. "winning") ringtone (e.g. "Ringtone A-1"). In some embodiments, the address book entry may be associated with a lottery authority, such as for example, "The New York Lottery". In some embodiments, the first and second ringtones may be audibly similar in nature, such as for example "Ringtone 1-A" and "Ringtone 1-B" (e.g. each ringtone may comprise four bars of music, with each of the first three bars being audibly identical).

Along with the winning lottery ringtone, the telco controller 104 may additionally send or transmit the call recipient a text (or other) message that includes a payout amount and instructions for receiving the payout. For example, the text message may read, "You just won $60, go to http://www.LottoRing.com to claim your prize!"

Figure 1B:
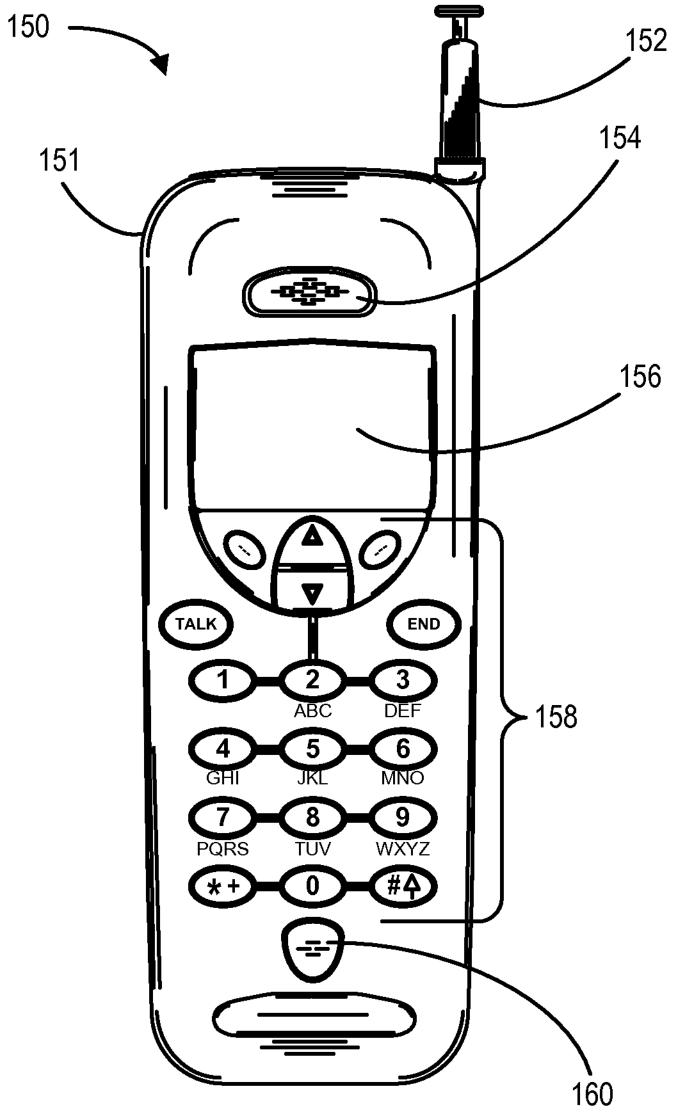
FIG. 1B is a simplified diagram of a telephone that may be used for implementing one or more aspects of the invention.

FIG. 1B is a simplified diagram of a device 150 of a type that may be used to practice one or more embodiments described herein. In this example embodiment, the device 150 is a mobile telephone (or cell phone) that includes a housing 151, an antenna 152, a speaker 154, a display 156, a keyboard 158 that includes a plurality of keys to access phone functions and to place calls, and a microphone 160. The mobile telephone 150 also contains various components (not shown) within the housing 151 such as a processor, storage or memory device (computer readable medium), input/output circuits, and other circuitry that enables a user to place and to receive calls. A computer readable medium that is either housed within the mobile telephone 150, or that may be operatively coupled to it (for example, an SD card inserted into a connector in the mobile phone), may store a lottery ringtone application (LRA), and/or may store instructions configured to direct a processor to provide the functions discussed herein, such as receiving information corresponding to a lottery outcome in conjunction with the receipt of an incoming telephone call and/or other communication (e.g. text message, page, e-mail, etc.). For example, the LRA may be configured to provide lottery information when an incoming telephone call is initiated, and that lottery information may include an indication of a winning lottery outcome in the form of a winning lottery ringtone to the call recipient by utilizing the telephone speaker 154. The LRA may also be configured to provide/trigger a losing ringtone via the speaker 154 when the lottery information includes an indication of a losing lottery outcome, and to display other lottery information, such as payout information, via the display 156. Such a mobile telephone 150 is typically lightweight and portable, and designed for use with one or more telephone companies (telcos) to provide the functionality described herein.

In some embodiments, an incoming communication (e.g. a text message or an audio call) from a first source (e.g. a telephone number associated with the state lottery) may trigger the provision and/or output of the first ringtone to the lottery player/mobile telephone user, thereby indicating that the telephone user has qualified to receive a payout or other prize from a lottery authority. For example, an incoming telephone call from a previously-specified number or other network address may trigger the provision and/or output of the first ("winning") ringtone to the player/telephone user.

In some embodiments, a Lottery Ringtone Application (LRA) may be installed on a user's telephone (e.g., installed by a manufacturer, a telephone user, a lottery retailer, or a third party), and the LRA may be capable of receiving and transmitting an indication of payment from the user. The indication of payment may be used to authorize the provision of a predetermined number of predetermined lottery outcomes, which, for example, may be stored in a memory device on the user's telephone. In one example, a user can pre-purchase a block of lottery outcomes. In some embodiments, lottery outcomes may be stored in an encrypted or encoded format to prevent tampering or viewing by unauthorized parties.

In response to an indication of an incoming communication (e.g. a telephone call or SMS), the LRA may select a lottery outcome from the number of predetermined lottery outcomes and may determine information associated with the selected outcome (e.g. if the outcome is a winning or losing outcome, the amount of any payout(s) associated with the outcome, etc.). In some embodiments, the player may be able to select a desired ringtone to be associated with a winning lottery outcome, and the player may also be able to select different ringtones to be associated with different winning payout amounts. In addition, the player may be able to select a desired losing ringtone. A losing ringtone may help to notify the player when a lottery outcome was issued, but did not result in a winning outcome. The player may select multiple ringtones to be used in different conditions such as a winning streak, a specific winning ringtone associated with one or more specific Caller ID(s), and/or a time of day. The ringtones may be selected from a third-party content provider. Thus, in a case of a winning outcome being selected and/or identified, the LRA may instruct the telephone to ring with an associated winning ringtone, and if a losing outcome is selected, the LRA may instruct the telephone to ring with an associated losing ringtone. One or more ringtones associated with a type of lottery outcome may be stored within memory located on the telephone.

In some embodiments, the LRA may provide additional information associated with the selected lottery outcome to the mobile phone user. Additional information may include: a history of selected lottery outcomes, a payout amount associated with one or more winning lottery outcomes, a number of remaining lottery outcomes, instructions for claiming a payout amount, a summary of some or all outcomes having been provided, and/or a visual output associated with the outcome (e.g. an animated rendering associated with the outcome). Further details relating to functionality are described herein below.

For example, a telephone user who wishes to receive a lottery outcome whenever he receives an incoming call on his cell phone downloads and installs a LRA to his mobile phone. The user chooses and pays for a block of 50 lottery entry outcomes to be downloaded and stored on his mobile phone, wherein one of each of the fifty lottery entry outcomes is to be indicated to the user whenever he receives an incoming call. The user also chooses to have a payment for the 50 lottery entry outcomes added to his monthly mobile phone bill. In addition, the user selects, via the LRA's user interface, a winning ringtone to be used if a winning lottery entry outcome is determined. The user may also opt to use his mobile phone's default ringtone if a losing outcome is determined and/or to be indicated.

Upon receiving an incoming call, the call recipient's mobile phone requests one lottery entry outcome from the fifty lottery entry outcomes previously stored using the LRA. In response to the request, the LRA selects (for example, randomly or sequentially) one of the 50 lottery entry outcomes stored in memory. The LRA determines that the selected lottery entry outcome is a winning lottery outcome and instructs the mobile phone to ring with the previously-selected winning ringtone, thereby indicating the occurrence of a winning outcome to the player/call recipient.

The LRA may be initiated or launched by the user at any time in order to access additional information pertaining to the lottery outcomes stored on his mobile phone. For example, if and/or when the user receives a winning outcome, the LRA may direct the phone to display an X-digit redemption code, which may be used to redeem an associated payout at and/or from a lottery retailer (e.g. via a dedicated retailer terminal).

In some embodiments, a player may be able to select an amount of lottery entries or which lottery games to play. For example, the lottery player may be able to specify that each lottery entry costs $0.10 instead of each lottery entry costing $0.50. The player may also be able to customize a package of lottery entries, for example, a package of 50 lottery entries that costs $23 to include 100×$0.10 entries (one-hundred ten cent entries), 8×$1 entries (eight one-dollar entries), and 1×$5 entry (one five-dollar entry). A rules-based system or random selection may be used to determine which lotto entry is applied on each transmission request. In addition, different lottery games may offer different pay tables, graphics, animations or other entertaining features.

Figure 2:
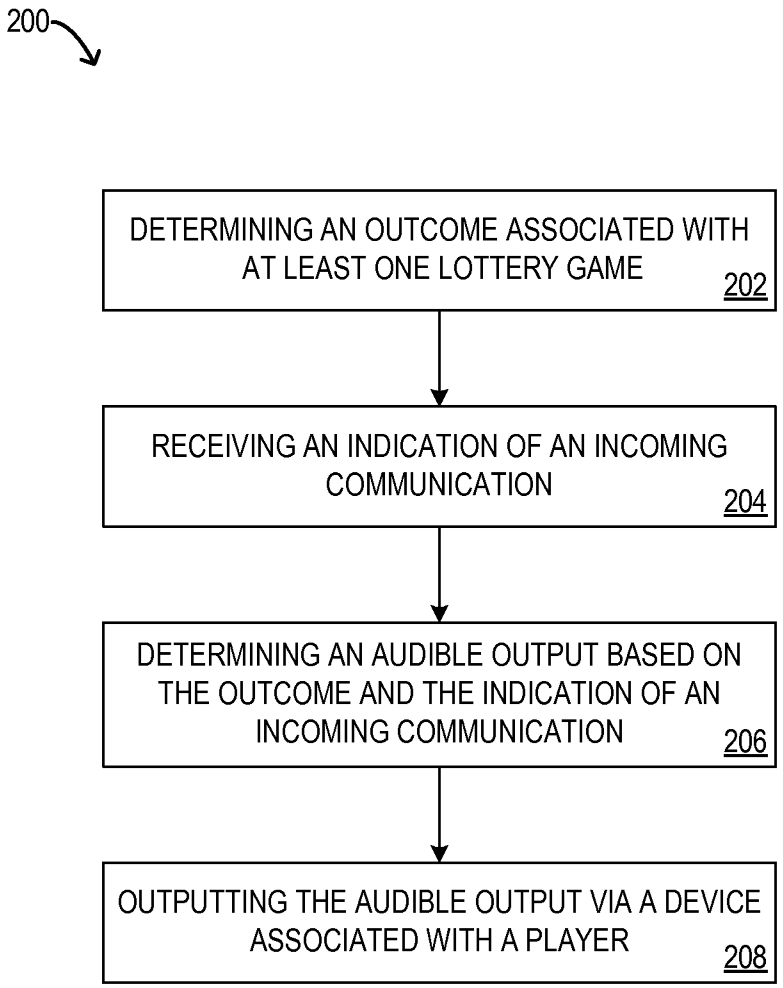
FIG. 2 is a simplified flowchart of a process for providing information about a lottery outcome (or lottery outcomes) to a player that may be performed, for example, by a server, controller, or other computing device (associated with a telephone company) and/or by a user device (such as a mobile phone) in accordance with the invention.

FIG. 2 is a flowchart of an example process 200 for providing information about a lottery outcome (or lottery outcomes) to a player (e.g., a phone user). The process may be performed, for example, by a server, controller, or other computing device (e.g., associated with a telco; for example, see FIG. 1A) and/or by a user device (e.g., a mobile phone). Of course, any process described herein may be performed by any device or combination of devices that is practicable and desirable. Furthermore, as also applies to all processes described herein, the steps and functions described may be performed in an order different from that illustrated, and additional or different steps may be included. Similarly, some steps may be omitted or combined.

Referring again to FIG. 2, the process 200 includes determining a lottery entry outcome associated with at least one lottery game 202. For example, a lottery entry outcome may be selected from a plurality of lottery outcomes (e.g., from entry outcomes that are stored by a lottery authority, a telco, or a mobile phone). In another example, the result of a lottery drawing may be determined. In some embodiments, determining an outcome comprises at least one of: determining if a payout is associated with the at least one lottery game; and determining a payout amount associated with the at least one lottery game. Determining the outcome may comprise determining the lottery outcome randomly based on a probability associated with a lottery game. In other embodiments, the outcome may be selected in sequence or at random from a plurality of predetermined lottery outcomes.

The process 200 also includes receiving an indication of an incoming communication 204. In some embodiments, the incoming communication comprises at least one of: a call; a text message; and/or an e-mail. For example, a telco may receive an indication of a phone call initiated by one caller to another phone user.

The process 200 also includes determining an audible output 206. The audible output is determined based on (i) the outcome and (ii) the indication of an incoming communication. For example, as described above, a particular ringtone may be selected based on the determined outcome (e.g., based on whether the outcome is a winning or losing outcome, and/or based on an associated value for the outcome) and also based on the incoming communication (e.g., in response to an incoming phone call). In other examples, determining the audible output may be based on who the call is from, when the call is made, what type of communication it is, and/or other factors. The process also includes outputting the determined audible output via a device associated with a player 208 (e.g., in response to the indication of the incoming communication). For example, a selected ringtone for a winning outcome is output at a mobile phone in response to (e.g., to announce) an incoming call. In some embodiments, the outputting of the audible output is further based on the entitlement of the player/recipient to an outcome associated with the at least one lottery game.

According to some embodiments, the process may include receiving information associated with at least one lottery game. For example, as described above, a user may register to receive lottery outcomes. In another example, a player may be entered in a lottery drawing, and the information includes information about the player's entry and/or the lottery drawing (e.g., numbers that may be drawn in the lottery drawing). In some embodiments, receiving information associated with at least one lottery game may comprise receiving information representing a pre-determined outcome for each of a plurality of lottery games. In other embodiments, receiving such information comprises receiving information corresponding to a total payout associated with a plurality of lottery outcomes. Determining an outcome may comprise, in accordance with some embodiments, receiving information associated with the at least one lottery game.

In some embodiments, the information associated with the at least one lottery game may be stored on a device associated with a player. For instance, storing may include, but need not necessarily comprise, storing the information associated with the at least one lottery game in a format that renders the information not human-recognizable (e.g. by encryption, etc.). For example, the information associated with the lottery game may be stored in a machine-readable format only (which may be an encrypted format) that cannot be read and/or recognized by a lottery player.

In some processes, human-recognizable information corresponding to the outcome associated with the at least one lottery game may be output upon determination of the outcome and in response to the incoming communication. For example, as described above, in response to an incoming communication, a mobile phone may display a text message of "You Win $5!" which can be read by the lottery player. This could occur if the mobile phone was set to silent mode at the time, or may occur in conjunction with the audible output.

Some processes may include a step of determining an initiating party based on the indication of the incoming communication (e.g. caller ID, cross-reference to contacts stored on phone, etc.). In some embodiments, a step of determining an outcome may be performed only if the initiating party is determined to be an identifiable party and/or a particular identified party (e.g. a particular friend or family member, etc.).

Some embodiments may include one or more of the following: determining redemption information (e.g., determining a code or other indicia by which a player may redeem any winning outcomes) and/or outputting redemption information to a player associated with a device.

Some embodiments allow for a player to redeem any winnings (e.g., to receive a payout amount). In one embodiment, an indication of redemption information is received, for example, via at least one of: a retailer terminal; the device associated with the player; and a web site. In some embodiments, a payout amount is determined based on the redemption information, and an indication of the payout amount for the player is output (e.g., via a retailer terminal, via a website).

In some embodiments, a telephone user may register for a lottery ringtone account which may enable the user's telephone to receive an indication of a lottery outcome. The registration process may include: storing preferential conditions under which the user would like to receive a lottery outcome, providing payment information (e.g. in exchange for a pre-paid number of lottery outcomes); storing information identifying a device associated with the user (e.g. an indication of a particular handset model and/or telephone number); billing information (e.g. billing address); and/or any other information that may be required to register a user to be eligible to receive lottery outcome information in accordance with the present methods (e.g. including providing an audible output in conjunction with the receipt of an incoming communication by the user device).

Additional information associated with one or more lottery entry outcomes may be made available once a lottery entry outcome has been indicated to the user. The additional information may include e.g.: a history of lottery entry outcomes for a user, a payout amount associated with one or more winning lottery entry outcomes, a number of remaining lottery entry outcomes, a method of claiming a payout amount associated with at least one winning lottery entry outcome, and the like.

Figure 3A:
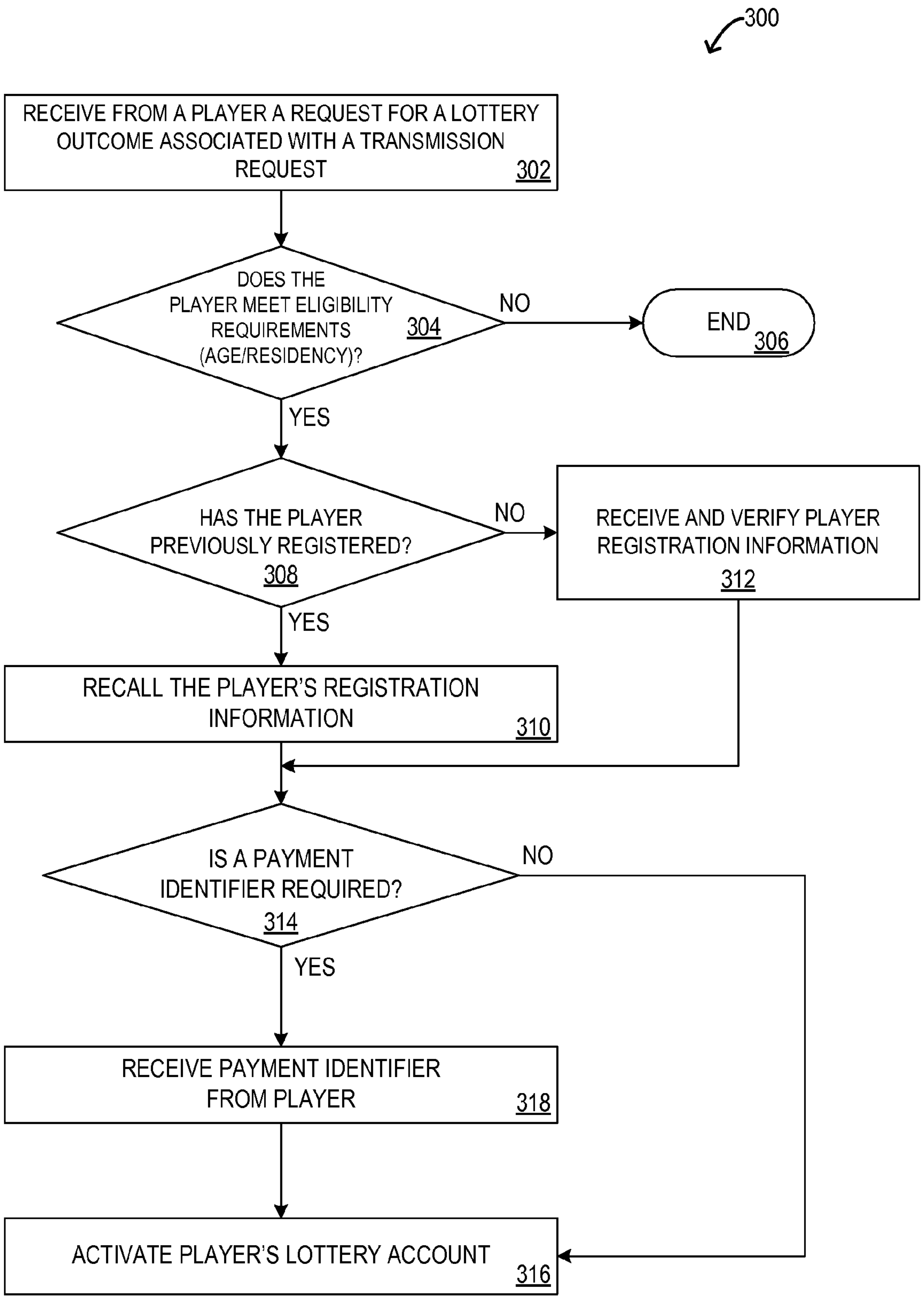
FIG. 3A is a flowchart of an example process that includes checking that the player meets eligibility requirements and is registered before activating a player's lottery account according to an embodiment of the invention.

FIG. 3A is a flowchart of an example process 300 according to an implementation for activating a player's lottery account. A request is received 302 from a player for a lottery outcome (or lottery entry) that is associated with a transmission request. For example, a player may request to receive twenty outcomes that will be provided in conjunction with one or more phone calls. Next, a determination is made as to whether the player meets eligibility requirements 304 (for example, for age and/or residency). If not, the process ends 306. Otherwise, a determination is made as to whether the player has previously registered 308. If so, the player's registration information is recalled 310. Otherwise, player registration information (various examples of which are described herein) is received and verified 312. If a payment identifier is not required 314, then a lottery account is activated 316 for the player. If, at step 314, a payment identifier is required, the player's lottery account is activated 316 after the payment identifier is received 318.

Regarding determining eligibility to receive a lottery outcome, a controller may utilize information associated with the transmission request in order to determine if a call recipient is eligible to receive a lottery outcome. The controller also may utilize information associated with a call recipient to determine if a call recipient is eligible to receive a lottery outcome. A call recipient's eligibility to receive a lottery outcome may be determined by a telco controller, a lottery administrator controller, and/or a third-party controller operatively connected with at least one of a telco controller or a lottery administrator controller. Thus, an indication of a call recipient's eligibility to receive a lottery outcome is sent to a controller capable of determining a result associated with a lottery outcome. In some embodiments, a single controller determines a call recipient's eligibility to receive a lottery outcome as well as a result and/or a payout associated with the lottery outcome, while in other embodiments, two or more controllers are utilized. In some other embodiments, a separate controller is used to determine the lottery entry outcome and/or payout information.

Figure 3B:
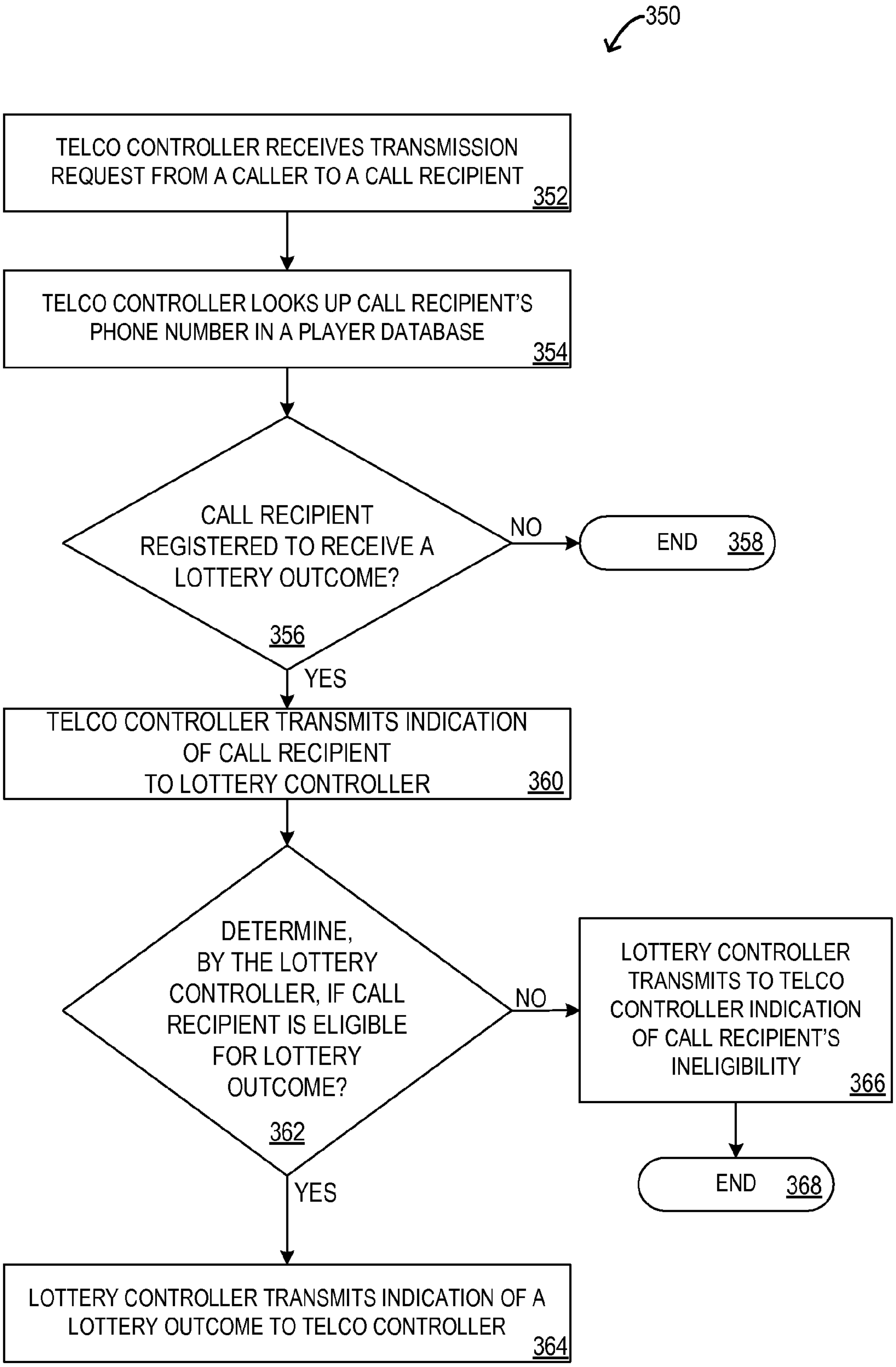
FIG. 3B is a flowchart of another example process according to the invention wherein a telephone company controller determines if a call recipient is registered and a lottery controller determines if the call recipient is eligible to receive lottery outcomes.

FIG. 3B is a flowchart of an example process 350 for determining the eligibility of a call recipient to receive a lottery entry outcome according to an embodiment. The process 350 includes a telco controller receiving 352 a transmission request from a caller to a call recipient, looking up 354 the call recipient's phone number in a player database, and determining 356 whether the call recipient is registered to receive a lottery entry outcome. If not, the process ends 358. But if the call recipient is registered, then the telco controller transmits 360 an indication of the call recipient to a lottery controller. The lottery controller then determines 362 whether the call recipient is eligible to receive a lottery entry outcome. If yes, then the lottery controller transmits 364 an indication of a lottery entry outcome to the lottery controller. If the call recipient is not eligible in step 362, then the lottery controller transmits 366 to the telco controller an indication of the call recipients' ineligibility, and the process ends 368.

Thus, in some embodiments, when an indication of an incoming call (or other communication, such as an SMS or e-mail) is received (e.g., prior to ringing the call recipient's telephone), a telco controller may request an indication of one or more lottery outcomes from a lottery controller. The lottery controller may then transmit an indication of an outcome to the telco controller (e.g. a winning or losing lottery outcome) and may also record the lottery outcome result within a database, such as a player database. In a case of receiving an indication of a winning lottery outcome, the telco controller may instruct the call recipient's telephone to ring with an associated winning ringtone. Alternatively, if an indication of a losing lottery outcome is received, the telco controller may instruct the call recipient's telephone to ring with an associated non-winning ringtone.

According to some embodiments, prior to receiving a lottery outcome associated with a transmission request, a player must complete a registration process. The player's registration information may be received in various ways. For example, the player's registration may be received via telephone (E.g., a call recipient provides identification information including their mobile phone number, then purchases 50 lottery outcomes to be received over their next 50 incoming mobile phone calls). Registration may be completed using an Interactive Voice Response (IVR) system capable of detecting voice and touch-tones during a call, or registration may be completed by a call center representative. A lottery retailer could register a player, wherein the player provides payment and registration information to the lottery retailer and receives a registration identifier such as a plastic card or paper slip, such means denoting the player's account number or other identifier. For example, a player may also be able to initiate a transaction at a lottery terminal and indicate that he would like to receive a lottery outcome every time his mother calls him on his mobile phone. The player provides the necessary registration information including a debit account number that is billed for each outcome he receives. Another registration method involves use of a website, wherein the Website may be associated with the lottery retailer, or the Website may be associated with the lottery authority, or the Website may be associated with the telco provider. Registration could also occur by use of a WAP browser, or an i-Mode browser, or by SMS, EMS or MMS messaging. A player could also register via a specialized application on a mobile phone (E.g., a Lottery Ringtone Application (LRA) on a mobile phone may prompt a player to provide the required registration information the first time it is executed). Such a specialized application may be preloaded on the mobile phone by a manufacturer, downloaded and installed on the mobile phone, or installed by a third party such as a telco provider or lottery administrator.

Registration information associated with a player may be received during the registration process and may be stored for later use in a database (e.g., a player database). Such information may include: a player's name; information that may require verification by a lottery authority, a lottery retailer, or a telco; a player's residential address (E.g., A player may need to provide a driver's license or other form of identification that includes the player's residence address to a lottery retailer); a player's birth date; a player's social security number; one or more phone numbers associated with the player; one or more email address(es) associated with the player; and/or a player's bank account number and bank routing number (E.g., Winning payouts may automatically be credited to a player's bank account).

Stored player information could be recalled during future lottery outcome purchases so that a player would not have to re-enter their registration information. The player database may be managed by a telco, lottery authority, or a third-party data management service, or the information could be stored on and/or indicated by a lottery receipt. For example, player information could be indicated by a barcode located on a paper receipt, or stored via the magnetic strip of a dedicated card. The player information could also be stored on a player's phone (E.g., a lottery ringtone application located on a player's phone may store the player's registration information and player preferences), and/or be stored on a memory card such as a Compact Flash, SD card, SIM card, mini-SD card, or Memory Stick.

A player's payout preferences, such as how and when they would like to receive a winning payout, may also be stored, for example, in a player database (E.g., a player may prefer to have winning payouts directly deposited into a bank account, or a player may prefer to have winning amounts credited towards outstanding bills such as a mobile phone bill or credit card bill). Other information may also be required and stored, such as a login name and password (e.g., that may be used to access the player's information), and/or a confirmation entry of previously supplied information (E.g., a player re-enters a password), and/or one or more security questions selected by the player with answers chosen by the player, for future use to verify the identity of the player when the player's account is accessed and/or when the player engages in future transactions.

A payment identifier may be required for a player to receive lottery information in conjunction with the receipt of a transmission request. The payment identifier may be provided by the call recipient/player. For example, a call recipient may provide a payment identifier in the form of: a mobile phone number or mobile phone account number, a credit card number, a debit account number, a gift card distributed by an authorized lottery agent, a bank account number, and/or a billing address. The payment identifier may be used to purchase a set of lottery outcomes, to purchase a single lottery outcome, and/or for purchasing an unlimited number of lottery outcomes during a specific time period (e.g. a billing period). The payment identifier may be used to purchase one or more lottery outcomes during player registration. Alternatively the payment identifier may be used to purchase one or more lottery outcomes following player registration.

According to some embodiments, no payment may be required. For example, lottery outcomes may be free or complimentary (For example, a mobile phone carrier may provide a call recipient with ten complimentary lottery outcomes each month, with a single outcome being received for each of the call recipient's first ten received calls occurring within the month). Lottery outcomes may be paid for by a telco or other mobile phone service provider (E.g., a telco that wishes to enhance revenue derived from phone usage may provide lottery outcomes for calls during "peak" hours; or a telco may allow a customer to turn their rollover minutes into an equally valued number of lottery outcomes; or the telco may provide one or more lottery outcomes to a call recipient if the call recipient signs up for one or more agreement(s), and/or added calling features, for example, the telco may offer a call recipient one lottery outcome for each of their next 100 calls if the call recipient signs up for a continuous 2-year service agreement). A lottery outcome may be paid for by a third party, for example, in exchange for the ability to output advertisements or other content via the call recipient's phone.

Figure 4:
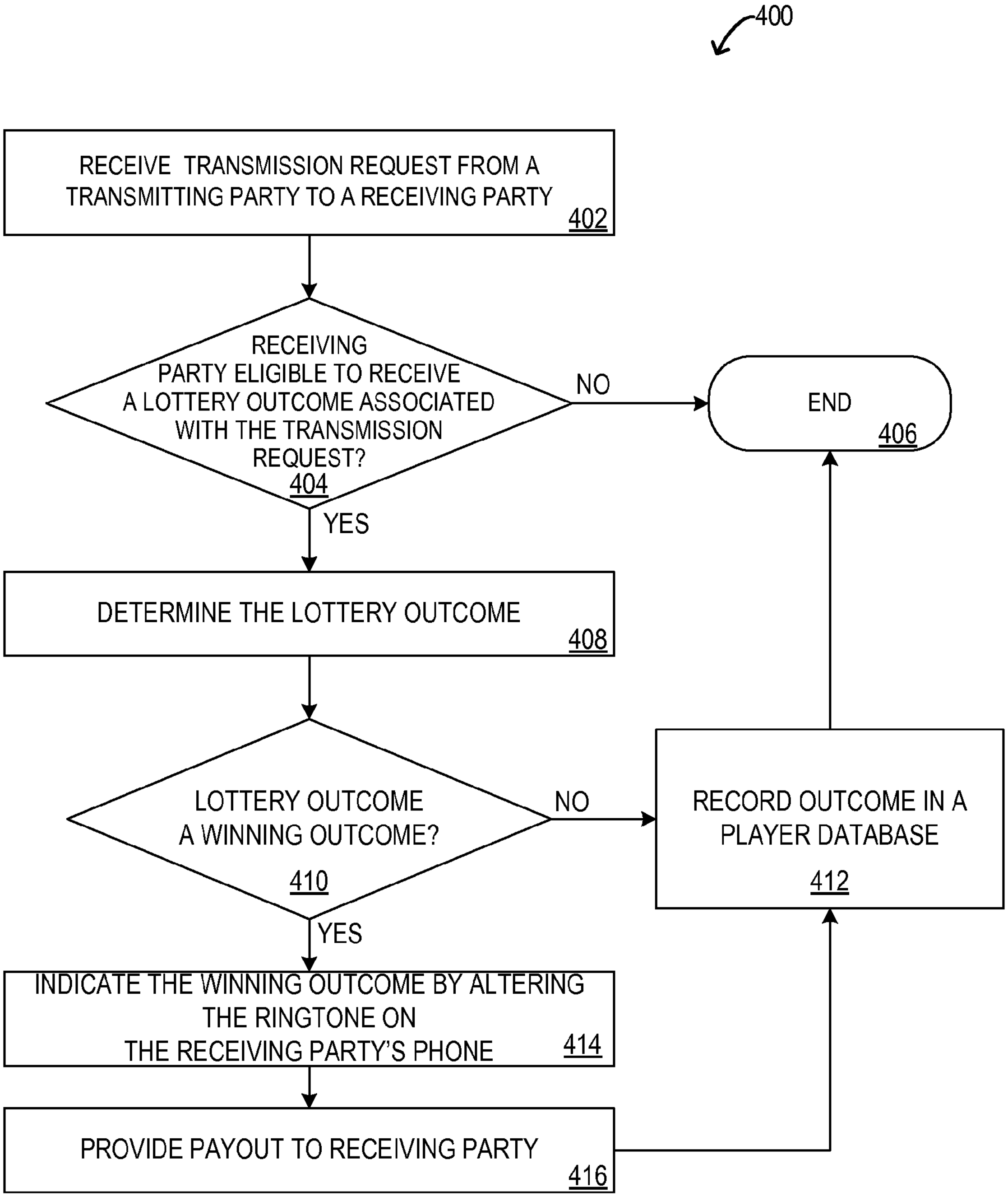
FIG. 4 is a flowchart of another example process that includes checking that a call recipient and/or player meets eligibility requirements before indicating a lottery outcome by altering the ringtone on the player's telephone in accordance with an embodiment of the invention.

FIG. 4 is a flowchart of an example process 400 for recording lottery entry outcomes in a player database. The process 400 includes receiving a transmission request from a transmitting party to a receiving party 402, and determining 404 whether the receiving party is eligible to receive a lottery outcome based on a transmission request (for example, based on whether the receiving party meets age and residency requirements). If not, the process ends 406. If the receiving party is eligible, then the process includes determining 408 a lottery outcome, and checking 410 the lottery outcome to determine if it is a winning outcome. If it is not a winning outcome, then the lottery outcome is recorded in a player database 412 and the process ends 406. But if the lottery outcome is determined to be a winning outcome in step 410, then the winning outcome is indicated 414 by modifying and/or altering and/or substituting and/or otherwise providing a winning outcome ringtone on the receiving party's phone. In some embodiments, a payout is provided to the receiving party 416, and the winning outcome is recorded in a player database before the process ends 406.

A lottery outcome may be indicated to a call recipient via a specified ringtone indicating a phone call, a SMS, an EMS, a MMS, and/or email. In some embodiments, the ringtone is "pushed" to the call recipient's phone. In another embodiment, a ringtone associated with a winning lottery outcome is stored on the call recipient's phone, and the call recipient's phone may be instructed by a LRA associated with the phone to play the winning ringtone. In some embodiments, a text message, voicemail, or phone call indicating a winning lottery outcome may be sent to the call recipient as an indication, in addition to the winning or losing ringtone, or instead of a winning or losing ringtone. The message may include lottery information, such as a winning amount, the number(s) matched, or instructions for how to receive a payout.

The lottery outcome may be indicated to the call recipient via a ringtone before call, a caller id before call, an introduction voice-over dub at the start of the call, a text message at the end of the call (e.g., a call recipient is only eligible to receive a lottery outcome for calls longer than 10 minutes, or a call recipient may receive one text message each day summarizing their lottery outcome(s) for that day), and/or an image or video clip (e.g., via MMS on a cell phone, for example, a cell phone application may display a video clip with associated audio showing slot machine reels spinning and landing on "BAR-BAR-BAR", or a cell phone application may display a video clip with associated audio showing a cartoon character, or a video of symbols being revealed on a lottery scratcher card). In addition, in some embodiments, lottery outcome indications may be provided to other parties. For example, a call recipient may choose to automatically notify their friends if they receive a winning outcome above a threshold amount.

In some embodiments, a call recipient may be able to review previous lottery entries or outcomes. In one embodiment, losing outcomes may not be indicated to a call recipient. In this case, the call recipient may check the number of remaining lottery outcomes by sending a text message containing his phone number to a lottery administrator. In another embodiment, a call recipient may be able view information relating to previously-used and/or unused lottery entries by viewing via web site, receiving a text message summary of entries/wins/losses, by viewing lottery entries and outcomes listed in additional column on a billing statement (e.g., a mobile phone billing statement, a ringtone lottery billing statement), or by launching the LRA on his cell phone.

In some embodiments, indicating lottery information to a call recipient includes pushing a set of purchased lottery outcomes to a player's mobile phone and storing the outcomes within an LRA on the phone. The lottery entries may be encrypted in order to ensure that the entries are not tampered with and/or viewed by unauthorized parties, and a duplicate set may also be stored in a player database, lottery controller database, lottery authority database, etc. A duplicate set of lottery outcomes for a player may be used for verification of any winning outcome(s) and/or payout amount(s). In another embodiment, an indication of the purchased lottery outcomes may be stored within a player database of a lottery controller. The lottery controller may transmit a lottery outcome to a player's phone upon receiving a request from a telco controller. In yet another embodiment each lottery outcome may be dynamically generated (e.g. based on a statistical model) upon request from a telco controller. In some embodiments, lottery outcomes are gifted from a customer and sent to another person. For example, a woman buys her mother 50 lottery outcomes for her birthday and those outcomes are transmitted to the mother's cell phone and stored within an LRA on that phone.

Regarding providing payouts to receiving parties, in some embodiments the payout amount may vary. For example, a payout for a large win (e.g., $100,000) may be treated differently than a payout for a small win (e.g., $10). In addition, different mechanisms of payout are possible for different win amounts or in accordance with player preferences. In some embodiments, a winning payout may be credited to a call recipient's account. For example, a winning payout is credited to the call recipient's mobile phone bill, or a winning payout is deposited into the call recipient's specified bank account, or a winning payout credited to the call recipient's credit card account. It is recognized that a call recipient may have multiple accounts, and thus different amounts could be divided out and credited to different accounts. In addition, a call recipient may have one account for purchasing entries, for example, and a second account for accumulating lottery wins (E.g., a lottery account is used to purchase entries, and to credit wins, and a credit card account is used to recharge the lottery account if funds run low in the lottery account). An account may be denominated in dollars, points, credits, or other currency.

In some embodiments, a call recipient may be provided payment for a winning outcome in the form of a check or other cash-equivalent, for example, a call recipient is sent a check in the mail. A winning payout may be provided by a lottery retailer upon verification of a winning lottery outcome. In addition, a call recipient may be provided with an ATM card during the lottery ringtone registration process. Upon receiving a winning lottery outcome, the call recipient also receives a valid PIN code that may be used to withdraw funds from an account associated with the ATM card.

In some embodiments, a winning payout may be used to purchase additional lottery entries. If the payout value is less than a predetermined threshold amount, the lesser amounts may accrue until they reach a total threshold balance (e.g. at least $10), at which time the receiving party/player may receive access to the total threshold amount. A winning outcome may be restricted for use to purchase additional lottery entries, and other restrictions may be applied by a lottery administrator or by a telco.

In some embodiments, a winning payout may be used to purchase items. For example, a player may use part of his winnings as a down payment on a automobile, or a player may use her winnings to purchase a weekend vacation. In some embodiments, one or more of the described features (and/or elements thereof) may not be necessary.

Figure 5:
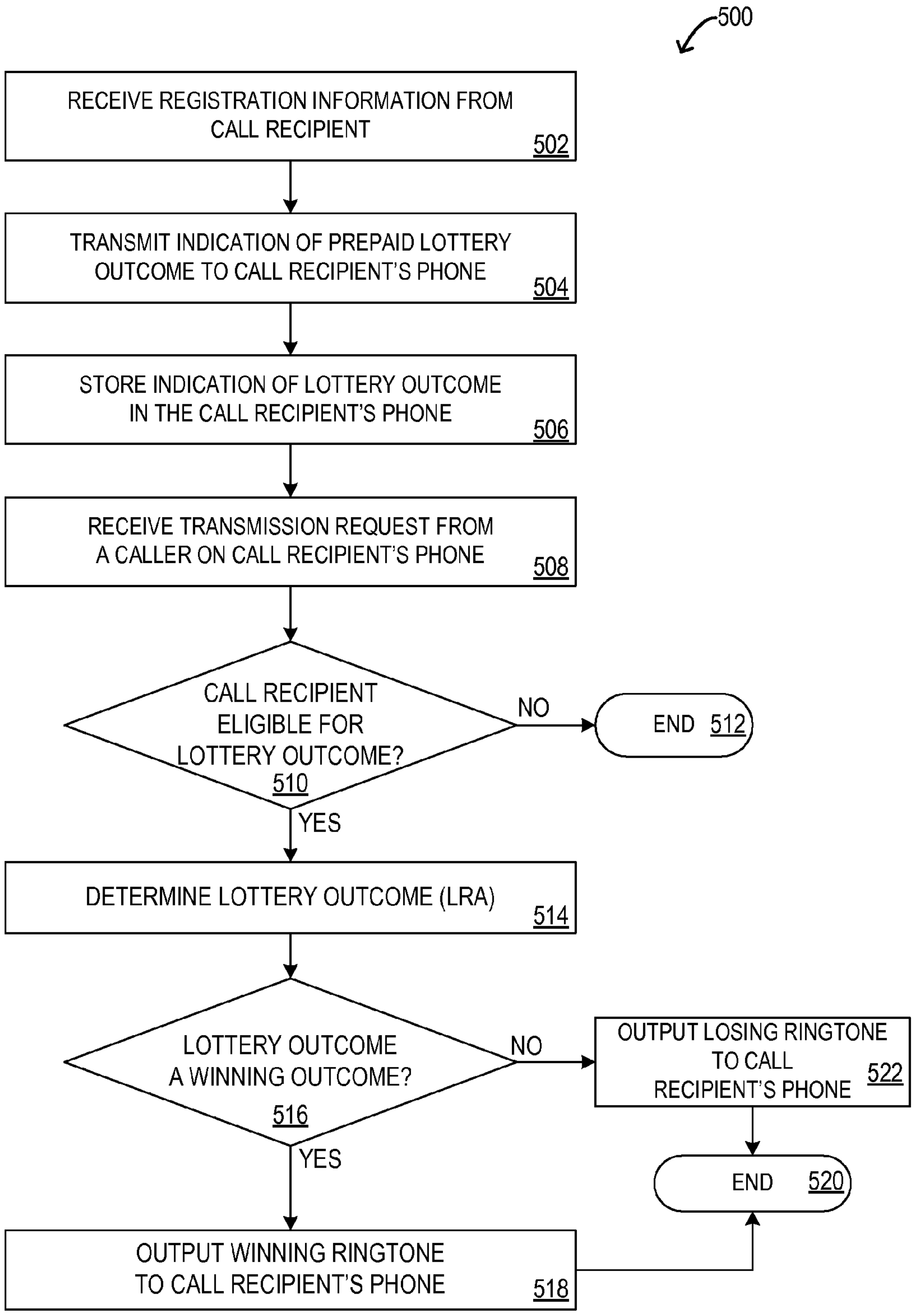
FIG. 5 is a flowchart of yet another example process according to the invention wherein an eligible call recipient receives either a winning ringtone or a losing ringtone at the call recipient's mobile phone depending on the lottery outcome.

FIG. 5 is a flowchart of an example process 500 for outputting a ringtone to indicate either a winning or losing lottery outcome to a registered call recipient. One or more of the indicated steps may be performed, for example, by a user device (e.g., based on instructions of an LRA). The process 500 includes receiving 502 registration information from a call recipient, transmitting 504 an indication of prepaid lottery entries to a call recipient's phone, storing 506 an indication of lottery outcomes at a user device (e.g., in an LRA of a phone of the call recipient), receiving 508 a transmission request from a caller to the user device (e.g., to a call recipient's phone), and determining 510 whether the call recipient is eligible for a lottery outcome. If the recipient is not eligible, the process ends 512. If the recipient is eligible to receive a lottery outcome, the method includes determining 514 a lottery outcome, and, if it is determined to be a winning outcome in step 516, outputting 518 a winning ringtone on the call recipient's phone, and the process ends 520. If, in step 516 it is determined that the lottery outcome is not a winning outcome (it's a losing outcome), then the method includes outputting 522 a losing ringtone to the call recipient's phone, and then the process ends 520.

C. Example Conditions for Indicating Lottery Outcomes

In some embodiments, a player may specify one or more conditions for when lottery outcomes should be indicated to the player/call recipient. In addition, the player may also specify one or more conditions when they should not receive a lottery outcome. Various conditions for determining if and/or when lottery outcomes should be indicated to the player/call recipient may be used. For example, lottery outcomes could be indicated to the player only during specific times of the day (e.g. not between the hours of 9 AM and 5 PM), or be limited to a schedule (e.g. once an hour, on the hour daily between noon and 8 PM). An indication of a lottery outcome may occur upon receiving an incoming communication only from a specified caller, caller group or phone number(s). Similarly, the player may specify specific callers with which to disassociate from lottery outcomes (e.g., based on a contacts list or address book stored in a phone's memory).

A lottery outcome may be indicated to a player/call recipient based on location information associated with the call recipient. For example, the call recipient may request to only receive a lottery outcome when he is within his local area code. Call recipient location may be determined using information obtained from cellular towers operatively connected to the call recipient's mobile phone. Location information may also be determined using GPS information (e.g. if the call recipient's mobile phone is GPS-enabled). Similarly, a lottery outcome may be indicated to a player based on location information associated with the caller. For example, a call recipient may request to only receive a lottery outcome when they are called by someone located within their hometown. A caller location may be determined using the caller's area code or local prefix, or the caller location may be determined using information obtained from cellular towers operatively in communication with the caller's mobile phone, or the caller location may be determined using GPS information (e.g. if the caller mobile phone is GPS enabled).

In addition, a player may wish to receive lottery outcomes at specific intervals (E.g., after every other phone call; after every 10$^{th}$ incoming call, etc.), Or the player may wish to receive lottery outcomes upon the occurrence of an irregularly-scheduled external event (e.g. indicate/reveal one lottery outcome on each day the New York Yankees win). In addition, lottery outcomes may be indicated based on conditions relating to a call recipient's phone ("state" or "mode" of the phone). For example, a call recipient may or may not wish to receive a lottery outcome if they are already on the phone, or a call recipient may or may not wish to receive a lottery outcome if they are currently using an application on their phone (E.g., a call recipient may not wish to have his phone ring if he is in the middle of writing an email). Furthermore, since many phones have different ringtone loudness levels, a lottery outcome indication may be disabled if a phone's ringtone level is set to a level less than 2 (quiet). An indication of a lottery outcome may also be based on the call recipient's calendar (wherein the call recipient may have a calendar stored on his phone or on a server). For example, if the call recipient's calendar shows that he is in a meeting, then lottery outcome indications may be suppressed, postponed, etc.

D. Examples of Processes

Bob, a player/user, visits www.XYZstatelottery.com where he specifies his cellular telephone number, billing address and handset model and initiates a download of a ringtone application from the XYZ State Lottery web site for use on his cellular phone. As part of the application download and installation process, Bob selects a winning and non-winning pair of ringtones for use in audibly communicating lottery outcome information. As further part of the ringtone application download and installation process, the application installs an address book entry and corresponding ("winning") ringtone on Bob's cellular phone. The address book entry includes a telephone number from which any incoming communication will trigger the audible output of the corresponding ("winning") ringtone to Bob, thereby informing him that he has qualified for a payout/prize, for example, from the state lottery. In addition, the application installs a new default ringtone for Bob's cellular telephone, such that any incoming communications not originating from the number associated with the address book entry will trigger the output/provision of the new default ringtone (which may be largely audibly similar to the "winning" ringtone).

Following the download, installation and configuration of the ringtone application, on Tuesday, January 2$^{nd}$, Bob visits a local lottery retailer to purchase lottery eligibility/chances in the XYZ State Lottery Ringtone Game. As part of the purchase process, Bob fills out a sense mark form at the retailer to specify his cellular telephone number. The retailer scans the sense mark form into the retailer's lottery terminal, which derives the information form the sense mark strip or form and transmits an indication of the telephone number to a centralized lottery system (e.g. in order to verify that the cellular phone associated with the number has previously downloaded and installed the lottery ringtone application, as described above). The centralized system then selects at least one predetermined outcome (e.g. including win/loss information and associated prize(s)/payout(s) (if any) from a predetermined pool of available lottery outcomes). In this case, Bob's particular lottery outcome is determined to be a wining outcome and is associated with a cash prize of $4. The centralized system then instructs the lottery terminal to print a paper ticket bearing an alphanumeric code, associated with the selected outcome and that may be utilized by the player/user, for example, to query the lottery system for information associated with that particular game instance. In addition to the alphanumeric code, the ticket includes printed information similar to the following: "Thank you for playing the XYZ State Lottery Ringtone Game. You are now eligible to participate in the Wednesday, January 3$^{rd}$ game. Here's how it works: Listen for the winning ringtone from your cell phone between 8:00 AM and 8:00 PM on January 3$^{rd}$. If you hear the winning ringtone, YOU'RE A WINNER! Simply present this ticket to any authorized lottery retailer to claim your prize. Good luck and THANKS for playing the XYZ State Lottery Ringtone Game!"

As explained above, the previously-determined outcome associated with Bob's particular game instance was determined to be $4, and thus the centralized lottery system determines (e.g. randomly, according to a pre-set formula or rule(s), etc.) a time within the 8:00 AM to 8:00 PM Wednesday, January 3rd time frame to initiate a telephone call to the cellular telephone number provided during registration and subsequent game purchase. For example, the system may determine to place an outgoing call to the provided telephone number at 2:45 PM on January 3rd. Accordingly, at 2:45 PM on January 3rd, the centralized system initiates an automated outbound telephone call to Bob's cellular phone from the number previously included in the winning number entry included in the address book of Bob's phone during the application download and install process. The incoming call is received by Bob's cellular phone, which determines (e.g. based on automatic number identification (ANI)) that the incoming call is associated with a specific ringtone (in the address book) to be audibly output, thereby indicating that Bob's particular game instance resulted in winning a prize. Bob's cellular phone then rings with the "winning" ringtone (stored in association with the address book entry), thereby informing Bob that he is indeed entitled to a lottery payout/prize.

It is noted that, prior to the incoming 2:45 PM call, all other inbound communications were indicated to Bob via a second (albeit slightly different than the winning ringtone) default ringtone. For example, each of the two different ringtones may comprise an identical crescendo with alternate endings.

Thus, at 2:45 PM, Bob answers the incoming call and is greeted with an automated message: "Congratulations! You've won $4 playing the XYZ State Lottery Ringtone Game. Present your printed game ticket to any authorized lottery retailer to claim your prize. Thanks for playing!" In addition to the automated call, at 8:00 PM on January 3rd, Bob receives a text message from the automated outbound lottery system recapping his $4 win and providing backup instructions on how to claim his prize.

On January 4th, Bob again visits his local lottery retailer and presents his prior day's game ticket for validation. The retailer scans the ticket through the retailer's lottery terminal, which verifies the $4 payout with the centralized lottery system. The retailer then pays the $4 to Bob, who is free to use the money to purchase another ticket and/or keep some or all of his prize for some other use.

E. Example of Incoming Communication From Previously Identified Party(ies) That Initiates the Provision of Lottery Outcome Information to the User In some embodiments, a lottery authority or other party may develop and/or deploy a lottery ringtone application for use by a user/lottery player, player device, or the like. In some embodiments, the application may provide entitlement of a lottery outcome (vs. the outcome itself) to be indicated to a user/recipient via an audible ringtone if/when an incoming communication is received from a party or device previously identified by the user/recipient.

In some embodiments, a user/recipient may configure the application to provide an indication of a lottery outcome each time an incoming call is received from any one of up to "X" identified calling parties (e.g. specific friends, relatives, groups, entities, and the like). In accordance with such embodiments, the application may function to monitor if/when an incoming communication is received from such a previously identified party and thereafter initiate the provision of lottery outcome information to the user/call recipient. More specifically, the application may interface with an address book function of the user device in order to identify such calling party(ies) (e.g. by comparing ANI information to information stored in the user device address book).

For example, Alice, a lottery player/call recipient/user visits the XYZ State lottery web site, where she registers the number of her smart phone, identifies her telephone handset model and initiates the download and installation of a Lottery Ringtone Application (LRA). Upon installation of the application on her smart phone, Alice is prompted to select up to five entries from her address book for use in conjunction with the Ringtone Application. Alice navigates a menu and selects three friends and two family members for use in conjunction with the Ringtone Application, and assigns to those parties an audible ringtone included in the downloaded application. Whenever Alice is an active participant in the game and receives an incoming communication from any one of the five identified parties, the incoming communication will trigger the provision of lottery outcome information to Alice, including the audible ringtone.

Upon having installed the application and identifying calling parties for use, Alice visits her local lottery retailer, where she purchases a game ticket bearing a unique serial number. The game ticket/serial number will enable the provision of a lottery outcome to Alice each time she receives an incoming communication from any one of the identified calling parties (up to a predetermined number of times from parties among the group). For example, the ticket may be good for the next 20 incoming phone calls of all calls received from among the five identified calling parties, or for each of the next four calls from each of the five parties. Via an interface of the Ringtone Application installed on her smart phone, Alice then enters the ticket serial number. An activation screen then indicates to Alice that the game has begun and that for each of her next twenty calls from among the identified parties, one lottery outcome will be provided. Later that day, Alice receives a call from her friend Jan. In accordance with the game, Alice had previously configured the Ringtone Application such that any incoming calls from Jan would trigger the provision of a lottery outcome. Upon receiving that call, Alice's phone determines that Jan's phone number is associated with the newly-installed application and/or ringtone and outputs the audible ringtone, thereby indicating to Alice that she is entitled to receive a lottery outcome by virtue of having received a call from one of the previously-identified calling parties (i.e. Jan). Alice answers the call and talks with Jan for a few minutes. After Alice hangs up, her phone (via the application) then indicates via an alert that she may now view the result (e.g. win/loss and/or any associated payout) of the provided lottery outcome. Alice then activates the application on her phone and views an animated representation of a scratch-off lottery ticket. The animated representation reveals that Alice has won $5 for that particular outcome and has 19 calls remaining with which to play. Over the course of the next few days, the remaining 19 calls are received and for each, a lottery outcome is provided in the manner described immediately above. After all 20 calls have been received, Alice has accrued a total of $14 in winnings, which is indicated to her via a summary screen/interface included with the application.

In order to claim her prize, Alice returns to her local lottery retailer and presents her previously-purchased printed ticket/serial number. The retailer scans the ticket into the retailer's online lottery terminal, which verifies with the XZY State back-end lottery system that the serial number included on Alice's ticket corresponds to a total payout/prize of $14. The retailer is then instructed to provide a $14 cash payment to the party bearing the ticket.

F. Additional Embodiments

F.1. Lottery Ringback

In some embodiments, a controller or LRA determines that a caller may be eligible to receive a lottery outcome. The lottery outcome is indicated to the caller using a unique ringback tone. For example, the controller enters a caller into a lottery when the caller places a call to a member of their "buddy" list. If the lottery outcome is determined to be a winning outcome, the ringback tone that the caller hears may be a custom "winning" tone. In addition or as an alternative to the custom ringback, the caller may receive a "winning" image, a "winning" vibration pattern, a "winning" light display, or a call from a call center representative.

In some embodiments, a notification signal that the caller won may also be provided to the receiving party. Also, in some embodiments, a telco may restrict Lottery Ringback as an optional service only available for use between/amongst its members.

F.2 Shared Winnings

A lottery payout may be split or shared between a caller and a call recipient. In some embodiments, a call recipient may have an option to predetermine a percentage split between them and a caller, and/or predetermine which callers may receive a share of a winning lottery payout. For example, only a caller associated with a winning lottery outcome is eligible to share in a winning payout, or the specified group the caller belongs to may share in a winning outcome's prize. The player may also be able to split the winnings after a winning outcome has been determined.

A winning call recipient may be able to designate the caller as a recipient of a specific percentage of the winnings. For example, Sarah receives a call from Sam, and hears a winning ringtone. Sarah had designated in her player database preferences that if she received a winning call from Sam, she would split the winnings with him, and the player database contains contact information for both Sam and Sarah so that both are able to go to the lottery retailer to redeem their winnings. In some embodiments, a payout could be credited to a party other than the player (for example, a contribution to charity). In a specific example, a player may designate that all of the player's wins of less than $10 are contributed to a particular charity.

F.3 Family Plan Ringtones

A "family plan" may be defined as two or more mobile phone numbers that are combined on a single bill. Each member of a family plan may have their own mobile phone as well as their own distinct phone number.

In some embodiments, the controller or LRA may provide lottery entries to a subset of family plan members based on eligibility requirements such as a minimum age. A single predetermined block of lottery outcomes may be associated with all eligible members of a family plan. Family plan lottery ringtone options may include limiting lottery outcomes to members eligible to participate in the lottery (the members of the account, LRA, controller, a Lottery authority or content provider may determine/decide eligibility). In addition, member controlled allocations of lottery entries amongst eligible family plan members may be offered. For example, Suzy purchases a package of 50 lottery outcome ringtones. She later accesses a player database where she allocates 10 lottery outcomes from that package to herself and designates John to have the other 40 lottery entries because he receives more phone calls than Suzy. Once allocated, John and Suzy are able to individually choose their own preferences concerning how their individual lottery outcome allocations are triggered.

F4. Lottery Entries

In some embodiments, the lottery information may comprise or include an entry into a lottery drawing. The entry information may be received and/or indicated to a call recipient in conjunction with a transmission request.

The call recipient may receive an entry into a weekly or bi-weekly lottery drawing. The call recipient may continue to collect/receive entries until sometime prior to the occurrence of the lottery drawing (e.g. up to one hour prior).

In some embodiments an outcome associated with a lottery entry may be determined based on the output of a random number generator, information associated with the call recipient, and/or Information associated with the caller. For example, a payout associated with a winning lottery outcome is multiplied by 5 if the caller is the call recipient's spouse. In another example, the caller may have been previously recruited by the player for purchasing a package of lottery outcomes (e.g., in a friend-to-friend type marketing program).

In some embodiments, the outcome may be determined by a Lottery administrator controller operatively connected to a telco controller, a Telco controller that may be operatively connected to a lottery administrator, and/or a third party controller associated with a lottery administrator controller or telco controller.

F.5. Collection of Symbols

The lottery system may implement a game (for example, similar to bingo) in which a player may collect symbols over the course of multiple transmission requests. If the player accumulates a full set of symbols, then the player may win a prize. For example, a player gets a new letter each time he receives a phone call (and the player may receive duplicate letters); a player may "win" symbols based on lotto results (and there may be no guarantee of a symbol being provided each time); a Ringtone indicates accumulated symbols; and/or at the end of set of outcomes, the player gets a prize based on number of accumulated symbols.

In some embodiments, symbols may be removed from a player's account based on conditions. For example, symbols are removed at the end of each set of lotto outcomes (e.g., when lotto outcomes purchased in a group), and/or symbols are removed for account inactivity, which may be defined as not enough phone calls being made during a predetermined time period. In some embodiments, a player may be required to perform qualifying activity to keep symbols active.

F.6 Player Notifications and Result Inquiries

In some embodiments, a player/call recipient may receive one or more notification(s), for example, if/when a predetermined amount of time has elapsed since obtaining eligibility to receive lottery outcome information (e.g. lottery outcome information indicated via an audible ringtone in conjunction with an incoming communication). For example, a player who has obtained one or more winning outcome(s) may be notified of such winning outcome(s) automatically (and/or periodically) and/or in accordance with one or more notification channels (e.g. the player may be notified at 6:00 PM, every weekday via text message). Notification channels may include channels associated with the player device (e.g., if the device is a cell phone, notification channels may include a telephone call, e-mail or text message to the cell phone) and/or other means (e.g. postal mail and/or another device associated with the player). In some embodiments, automatic and/or periodic notification may be useful or desired, for example, if/when a player is unable to ascertain lottery outcome information for some reason (for example, that player has turned off his or her cell phone, the player device has become lost or damaged, etc.).

A player may initiate a lottery outcome result inquiry. For example, the player/call recipient may initiate an outgoing phone call to an automated system (e.g., an automatic system of a Lottery Authority) and/or may access a web site to inquire as to the status(es) of one or more lottery outcome(s).

F.7. Determination/Alterations of Outcome Distribution Based on Incoming Communications Volume In some embodiments, an outcome distribution (and/or payout amount(s)) may be determined and/or altered based on a volume of incoming communications associated with a call recipient/player. For example, where a first recipient is determined to be associated with a relatively-low (first) volume of incoming communications (for example, on average fewer than 10 incoming communications per week), a \$7 outcome distribution may be determined to comprise the following sequence:

$$\frac{\textit{Comm. } 1 \quad \textit{Comm. } 2 \quad \textit{Comm. } 3 \quad \textit{Comm. } 4 \quad \textit{Comm. } 5}{0 \quad \$5 \quad 0 \quad 0 \quad \$2} = \$7$$

However, a second recipient may be determined (e.g. by a telco) to be associated with a relatively-high(er) (second) volume of incoming communications (e.g. on average, greater than 100 incoming communications per week), a \$7 outcome distribution may comprise the following sequence:

$$\frac{\ldots \textit{Comm. } 12 \ldots \textit{Comm. } 26 \ldots \textit{Comm. } 48 \ldots \textit{Comm. } 67 \ldots \textit{Comm. } 100}{\$2.00 \ldots \$1 \ldots \$0.50 \ldots \$3.50 \ldots 0} = \$7$$

In some cases, it may be preferable or desirable to allow for the determination and/or alteration of an outcome distribution based on a volume of incoming communications associated with a player/call recipient in order to adapt the delivery of lottery outcome information to "fit" at least a minimum amount or duration of time (for example, in some embodiments outcome information may be communicated periodically throughout the entire course of a week, instead of communicated over the course of a given number of incoming communications).

G. Rules of Interpretation

Numerous embodiments have been described, and were presented for illustrative purposes only. The described embodiments are not intended to be limiting in any sense. The novel processes, apparatus and systems are widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention. Accordingly, those skilled in the art will recognize that the present invention may be practiced with various modifications and alterations. Although particular features may have been described with reference to one or more particular embodiments or figures that form a part of the present disclosure, and in which are shown, by way of illustration, specific embodiments, it should be understood that such features are not limited to usage in the one or more particular embodiments or figures with reference to which they are described. The present disclosure is thus neither a literal description of all embodiments of the invention nor a listing of features of the invention that must be present in all embodiments.

The terms "an embodiment", "embodiment", "embodiments", "the embodiment", "the embodiments", "an embodiment", "some embodiments", "an example embodiment", "at least one embodiment", "one or more embodiments" and "one embodiment" mean "one or more (but not necessarily all) embodiments of the present invention(s)" unless expressly specified otherwise. The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or subcomponent from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c, or (vii) A may comprise a, b and c.

The terms "a", "an" and "the" mean "one or more", unless expressly specified otherwise.

The term "based on" means "based at least on", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference to a 'step' or 'steps' of a method is deemed to have sufficient antecedent basis.

Headings of sections provided in this document and the title are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary, a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device and/or article. Similarly, where more than one device or article is described herein (whether or not they cooperate), it will be readily apparent that a single device and/or article may be used in place of the more than one device or article.

The functionality and/or the features of a device may be alternatively embodied by one or more other devices which are not explicitly described as having such functionality and/or features. Thus, other embodiments of the present invention need not include the device itself.

The term "computer-readable medium" as used herein refers to any medium that participates in providing data (e.g., instructions) that may be read by a computer, a processor or a like device. Such a medium may take many forms, including but not limited to, non-volatile media and volatile media. Non-volatile media may include, for example, optical or magnetic disks and other persistent memory. Volatile media may include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in providing sequences of instructions to a processor. For example, sequences of instruction (i) may be delivered from RAM to a processor, (ii) may be wirelessly transmitted, and/or (iii) may be formatted according to numerous formats, standards or protocols, such as Transmission Control Protocol, Internet Protocol (TCP/IP), Wi-Fi, Bluetooth, TDMA, CDMA, and 3G.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device that accesses data in such a database.

For example, as an example alternative to a database structure for storing information, a hierarchical electronic file folder structure may be used. A program may then be used to access the appropriate information in an appropriate file folder in the hierarchy based on a file path named in the program.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning. In addition, unless a claim element is defined by reciting the word "means" and a function without reciting any structure, it is not intended that the scope of any claim element be interpreted based on the application of 35 U.S.C. §112, sixth paragraph.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed herein. It is well known to one of ordinary skill that a specified function may be implemented via different algorithms, and any of a number of different algorithms would be a design choice for carrying out the specified function.

While various embodiments have been described it should be understood that the scope of the present invention is not limited to the particular embodiments explicitly described. Many other variations and embodiments would be understood by one of ordinary skill in the art upon reading this disclosure.

What is claimed is:

1. A method, comprising;

receiving an indication of an incoming communication;

determining a lottery entry outcome of at least one lottery game;

determining an audible output based on the lottery entry outcome and on the indication of the incoming communication;

outputting the audible output via a player device to indicate both the incoming communication and the lottery entry outcome, wherein the incoming communication comprises an incoming call to the player device from a caller; and wherein the audible output comprises a ringtone indicating both the lottery entry outcome and the incoming call.

2. The method of claim 1, in which determining the audible output comprises:

determining that the lottery entry outcome is a winning lottery entry outcome; and selecting the ringtone.

3. The method of claim 1, in which determining the audible output comprises:

determining that the lottery entry outcome is a losing lottery entry outcome; and selecting the ringtone.

4. The method of claim 1, in which receiving an indication of an incoming communication comprises receiving an indication of the incoming call.

5. The method of claim 1, further comprising storing the information associated with the at least one lottery game on the player device.

6. The method of claim 1, further comprising, in response to the incoming communication, displaying information corresponding to the lottery entry outcome.

7. The method of claim 1, in which determining the lottery entry outcome comprises determining that a payout amount is associated with the lottery entry outcome.

8. The method of claim 7, further comprising outputting an indication of the payout amount.

9. The method of claim 1, further comprising determining the caller based on the indication of the incoming communication.

10. The method of claim 9, in which determining the caller comprises finding the caller in an address book.

11. The method of claim 9, in which determining the lottery entry outcome occurs only if the caller corresponds to a party identified by a lottery player.

12. The method of claim 9, in which outputting the audible output occurs only if the caller corresponds to a party identified by a lottery player.

13. The method of claim 1, further comprising receiving information corresponding to predetermined lottery entry outcomes for each of a plurality of lottery entries.

14. The method of claim 13, further comprising receiving information corresponding to a total payout amount associated with the plurality of lottery entries.

15. The method of claim 1, in which determining a lottery entry outcome of at least one lottery game further comprises:

receiving an indication of payment for at least one lottery entry outcome;

transmitting a set of lottery entry outcomes to the player device; and storing the set of lottery entry outcomes on the player device.

16. The method of claim 1, in which determining the lottery entry outcome comprises randomly determining the lottery entry outcome based on a probability associated with the lottery game.

17. The method of claim 1, further comprising outputting redemption information for display on the player device.

18. The method of claim 1, further comprising outputting redemption information for display on at least one of a retailer terminal or a web site.

19. The method of claim 1, further comprising, prior to determining a lottery entry outcome, determining that a player associated with the player device is eligible to receive a lottery entry outcome.

20. The method of claim 1, further comprising, prior to determining a lottery entry outcome, determining that a player associated with the player device is registered with a lottery authority.

21. The method of claim 1, further comprising, prior to determining a lottery entry outcome:

determining that a player is eligible to receive a lottery entry outcome;

determining that the player has registered for a lottery account;

receiving payment information; and activating the lottery account of the player.

22. The method of claim 1, further comprising recording the lottery entry outcome in a database.

23. The method of claim 1, further comprising, prior to outputting the audible output, determining that a player condition has been satisfied.

24. The method of claim 23, wherein the player condition comprises receiving an incoming communication from at least one of a specified caller, caller group, or phone number.

25. The method of claim 23, wherein the player condition comprises receiving an incoming communication at least one of during a predetermined time of day, on a schedule, or during specific intervals.

26. The method of claim 23, wherein the player condition comprises at least one of location information for an incoming communication, a status of the player device, or completion of an event.

27. The method of claim 1, further comprising:

storing a set of lottery entry outcomes on the player device;

in which receiving an indication of an incoming communication comprises:

after storing the set of lottery entry outcomes on the player device, receiving the indication of the incoming communication;

in which determining an audible output based on the lottery entry outcome and on the indication of the incoming communication comprises:

in response to determining the indication of the incoming communication, determining the audible output based on the lottery entry outcome and on the indication of the incoming communication; and in which outputting the audible output via a player device to indicate both the incoming communication and the lottery entry outcome comprises:

in response to determining the indication of the incoming communication, outputting the audible output via the player device.

28. A non-transitory computer readable medium storing instructions configured to direct a processor to:

receive an indication of an incoming communication;

determine a lottery entry outcome of at least one lottery game;

determine an audible output based on the lottery entry outcome and on the indication of the incoming communication;

output the audible output via a player device to indicate both the incoming communication and the lottery entry outcome, wherein the incoming communication comprises an incoming call to the player device from a caller; and wherein the audible output comprises a ringtone indicating both the lottery entry outcome and the incoming call.

29. The non-transitory computer readable medium of claim 28, in which the instructions for determining the audible output comprise instructions configured to direct the processor to:

determine that the lottery entry outcome is a winning lottery entry outcome; and select the ringtone.

30. The non-transitory computer readable medium of claim 28, in which the instructions for determining the audible output comprise instructions configured to direct the processor to:

determine that the lottery entry outcome is a losing lottery entry outcome; and select the ringtone.

31. The non-transitory computer readable medium of claim 28, in which the instructions for receiving an indication of an incoming communication comprise instructions configured to direct the processor to receive an indication of the incoming call.

32. The non-transitory computer readable medium of claim 28, further comprising instructions configured to direct the processor to store the information associated with the at least one lottery game on the player device.

33. The non-transitory computer readable medium of claim 28, further comprising instructions configured to direct the processor to display information corresponding to the lottery entry outcome.

34. The non-transitory computer readable medium of claim 28, in which the instructions for determining the lottery entry outcome comprise instructions configured to direct the processor to determine that a payout amount is associated with the lottery entry outcome.

35. The non-transitory computer readable medium of claim 34, further comprising instructions configured to direct the processor to output an indication of the payout amount.

36. The non-transitory computer readable medium of claim 28, further comprising instructions configured to direct the processor to determine the caller based on the indication of the incoming communication.

37. The non-transitory computer readable medium of claim 36, in which the instructions for determining the caller comprise instructions configured to direct the processor to find the caller in an address book.

38. The non-transitory computer readable medium of claim 36, in which the instructions for determining the lottery entry outcome comprise instructions configured to direct the processor to determine the lottery entry outcome only if the caller corresponds to a party identified by a lottery player.

39. The non-transitory computer readable medium of claim 36, in which the instructions for outputting the audible output comprise instructions configured to direct the processor to output the audible output only if the caller corresponds to a party identified by a lottery player.

40. The non-transitory computer readable medium of claim 28, further comprising instructions configured to direct the processor to receive information corresponding to predetermined lottery entry outcomes for each of a plurality of lottery entries.

41. The non-transitory computer readable medium of claim 40, further comprising instructions configured to direct the processor to receive information corresponding to a total payout amount associated with the plurality of lottery entries.

42. The non-transitory computer readable medium of claim 28, in which the instructions for determining a lottery entry outcome further comprise instructions configured to direct the processor to:

receive an indication of payment for at least one lottery entry outcome;

transmit a set of lottery entry outcomes to the player device; and store the set of lottery entry outcomes on the player device.

43. The non-transitory computer readable medium of claim 28, in which the instructions for determining the lottery entry outcome comprise instructions configured to direct the processor to randomly determine the lottery entry outcome based on a probability associated with the lottery game.

44. The non-transitory computer readable medium of claim 28, further comprising instructions configured to direct the processor to output redemption information for display on the player device.

45. The non-transitory computer readable medium of claim 28, further comprising instructions configured to direct the processor to output redemption information for display on at least one of a retailer terminal or a web site.

46. The non-transitory computer readable medium of claim 28, further comprising instructions configured to direct the processor to determine that a player associated with the player device is eligible to receive a lottery entry outcome.

47. The non-transitory computer readable medium of claim 28, further comprising instructions configured to direct the processor to determine that a player associated with the player device is registered with a lottery authority.

48. The non-transitory computer readable medium of claim 28, further comprising instructions configured to direct the processor to:

determine that a player is eligible to receive a lottery entry outcome;

determine that the player has registered for a lottery account;

receive payment information; and activate the lottery account of the player.

49. The non-transitory computer readable medium of claim 28, further comprising instructions configured to direct the processor to record the lottery entry outcome in a database.

50. The non-transitory computer readable medium of claim 28, further comprising instructions configured to direct the processor to determine that a player condition has been satisfied before outputting the audible output.

51. The non-transitory computer readable medium of claim 50, in which the instructions for determining that a player condition has been satisfied comprise instructions configured to direct the processor to determine when an incoming communication is from at least one of a specified caller, caller group, or phone number.

52. The non-transitory computer readable medium of claim 50, in which the instructions for determining that a player condition has been satisfied comprise instructions configured to direct the processor to determine that the incoming communication occurred during a predetermined time of day, on a schedule, or during specific intervals.

53. The non-transitory computer readable medium of claim 50, in which the instructions for determining that a player condition has been satisfied comprise instructions configured to direct the processor to determine that the player condition is satisfied based on at least one of an incoming communication from a predetermined location, a status of the player device, or upon completion of an event.

54. An apparatus, comprising:

a processor; and a storage device operably connected to the processor, the storage device storing instructions configured to direct the processor to:

receive an indication of an incoming communication;

determine a lottery entry outcome of at least one lottery game;

determine an audible output based on the lottery entry outcome and on the indication of the incoming communication; and output the audible output via a player device to indicate both the incoming communication and the lottery entry outcome, wherein the incoming communication comprises an incoming call to the player device from a caller; and wherein the audible output comprises a ringtone indicating both the lottery entry outcome and the incoming call.

55. The non-transitory computer readable medium of claim 28, further comprising instructions configured to direct the processor to store a set of lottery entry outcomes on the player device;

in which receiving an indication of an incoming communication comprises:

after storing the set of lottery entry outcomes on the player device, receiving the indication of the incoming communication;

in which determining an audible output based on the lottery entry outcome and on the indication of the incoming communication comprises:

in response to determining the indication of the incoming communication, determining the audible output based on the lottery entry outcome and on the indication of the incoming communication; and in which outputting the audible output via a player device to indicate both the incoming communication and the lottery entry outcome comprises:

in response to determining the indication of the incoming communication, outputting the audible output via the player device.

56. A method, comprising:

providing a lottery ringtone application for installation on a player device;

receiving an indication of payment for at least one lottery entry outcome;

providing the at least one lottery entry outcome to the player device;

after providing the at least one lottery entry outcome to the player device, receiving an indication of an incoming communication to the player device;

selecting, by the lottery ringtone application, a lottery entry outcome provided to the player device;

determining that the selected lottery entry outcome is a winning lottery entry outcome; and in response to receiving the indication of the incoming communication to the player device, instructing the player device to output a ringtone that indicates the incoming communication and the winning lottery entry outcome.

57. The method of claim 56, wherein the ringtone indicating the winning lottery outcome comprises a ringtone selected by a player.

58. The method of claim 56, further comprising providing additional information associated with the winning lottery entry outcome, wherein the additional information comprises at least one of a payout amount associated with the winning lottery entry outcome, instructions for claiming a payout amount, a visual output associated with the winning lottery entry outcome, a number of remaining lottery entry outcomes, or a history of selected lottery entry outcomes.

59. The method of claim 56, further comprising, selecting a second lottery entry outcome;

determining that the second lottery entry outcome is a losing lottery outcome; and instructing the player device to output a ringtone that indicates the losing lottery entry outcome.

60. The method of claim 59, wherein the ringtone that indicates the losing lottery entry outcome is a default ringtone.

61. The method of claim 56, in which receiving the indication of payment comprises receiving instructions to have payment for the at least one lottery entry outcome charged to a mobile phone bill.

62. A non-transitory computer readable medium storing instructions configured to direct a processor to:

provide a lottery ringtone application for installation on a player device;

receive an indication of payment for at least one lottery entry outcome;

provide the at least one lottery entry outcome to the player device;

after providing the at least one lottery entry outcome to the player device, receive an indication of an incoming communication to the player device;

select, by the lottery ringtone application, a lottery entry outcome provided to the player device;

determine that the selected lottery entry outcome is a winning lottery entry outcome; and in response to receiving the indication of the incoming communication to the player device, instruct the player device to output a ringtone that indicates the incoming communication and the winning lottery entry outcome.

63. The non-transitory computer readable medium of claim 62, in which the instructions for instructing the player device to output a ringtone comprise instructions configured to direct the processor to instruct the player device to utilize a ringtone selected by a player.

64. The non-transitory computer readable medium of claim 62, further comprising instructions configured to direct the processor to instruct the player device to output additional information associated with the winning lottery entry outcome, wherein the additional information comprises at least one of a payout amount associated with the winning lottery entry outcome, instructions for claiming a payout amount, a visual output associated with the winning lottery entry outcome, a number of remaining lottery entry outcomes, or a history of selected lottery entry outcomes.

65. The non-transitory computer readable medium of claim 62, further comprising instructions configured to direct the processor to:

select a second lottery entry outcome;

determine that the second lottery entry outcome is a losing lottery outcome; and instruct the player device to output a ringtone that indicates the losing lottery entry outcome.

66. The non-transitory computer readable medium of claim 65, in which the instructions for instructing the player device to output the ringtone indicating a losing lottery entry outcome comprise instructions configured to direct the processor to instruct the player device to output a default ringtone.

67. The non-transitory computer readable medium of claim 62, in which the instructions for receiving the indication of payment comprise instructions configured to direct the processor to receive instructions to have payment for the at least one lottery entry outcome charged to a mobile phone bill.

68. An apparatus, comprising:

a processor; and a storage device operably connected to the processor, the storage device storing instructions configured to direct the processor to:

provide a lottery ringtone application for installation on a player device;

receive an indication of payment for at least one lottery entry outcome;

provide the at least one lottery entry outcome to the player device;

after providing the at least one lottery entry outcome to the player device, receive an indication of an incoming communication to the player device;

select, by the lottery ringtone application, a lottery entry outcome provided to the player device;

determine that the selected lottery entry outcome is a winning lottery entry outcome; and in response to receiving the indication of the incoming communication to the player device, instruct the player device to output a ringtone that indicates the incoming communication and the winning lottery entry outcome.

* * * * *